(12) United States Patent
Haimer et al.

(10) Patent No.: US 8,579,562 B2
(45) Date of Patent: Nov. 12, 2013

(54) VIBRATION-DAMPED TOOL HOLDER

(75) Inventors: Franz Haimer, Igenhausen (DE); Josef Haimer, Igenhausen (DE); Hermann Kopp, Langenmosen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 1579 days.

(21) Appl. No.: 10/585,807

(22) PCT Filed: Jan. 14, 2005

(86) PCT No.: PCT/EP2005/000321
§ 371 (c)(1),
(2), (4) Date: Sep. 5, 2008

(87) PCT Pub. No.: WO2005/068118
PCT Pub. Date: Jul. 28, 2005

(65) Prior Publication Data
US 2009/0003947 A1    Jan. 1, 2009

(30) Foreign Application Priority Data

Jan. 16, 2004 (DE) .......................... 10 2004 002 453
Apr. 23, 2004 (DE) .......................... 10 2004 019 869
May 19, 2004 (DE) .......................... 10 2004 024 745

(51) Int. Cl.
*B23Q 3/00* (2006.01)
*B23B 31/117* (2006.01)
*B24B 41/00* (2006.01)

(52) U.S. Cl.
USPC ........... 409/234; 409/141; 408/143; 279/102; 451/259; 451/342; 451/358

(58) Field of Classification Search
USPC ................. 409/141, 234, 143; 279/102, 103; 408/143; 451/259, 342, 358
See application file for complete search history.

(56) References Cited

U.S. PATENT DOCUMENTS

| 2,835,023 A | 5/1958 | Steeves |
| 3,642,378 A | 2/1972 | Hahn et al. |
| 3,663,116 A | 5/1972 | Muller et al. |

(Continued)

FOREIGN PATENT DOCUMENTS

| DE | 34 09 581 C2 | 9/1984 |
| WO | WO 03/093696 A2 | 11/2003 |

OTHER PUBLICATIONS

European Patent Office Search Report dated Jul. 5, 2004.

*Primary Examiner* — Debra Sullivan
(74) *Attorney, Agent, or Firm* — Edwards Wildman Palmer LLP; Scott D. Wofsy; David A. Tucker

(57) ABSTRACT

A tool holder (10) for a tool which can rotate about an axis of rotation (D) comprises a clamping shank (18) which, in an end shank region, has a clamping formation (14) with an accommodating opening (16) which is central in relation to the axis of rotation (D) and is intended for accommodating a retaining shank of the tool, there being provided, on the lateral circumference of the accommodating opening (16), at least one clamping surface for securing the retaining shank of the tool with press-fit action. According to the invention, on an axial section which forms an axial bracing section (VA), the tool holder (10) has a bracing arrangement (20) which, at least during operation of the tool holder (10), subjects the tool holder (10) to a bracing force (Vk) with a bracing force component (Vk) acting in the axial direction.

61 Claims, 31 Drawing Sheets

(56) References Cited

U.S. PATENT DOCUMENTS

| | | | |
|---|---|---|---|
| 3,859,699 A | 1/1975 | Lindskog | |
| 4,871,286 A | 10/1989 | Hunt | |
| 4,998,851 A | 3/1991 | Hunt | |
| 5,775,857 A * | 7/1998 | Johne | 409/234 |
| 6,280,126 B1 | 8/2001 | Wasson et al. | |

* cited by examiner

VIBRATION-DAMPED TOOL HOLDER

The present invention relates to a tool holder for a tool which can rotate about an axis of rotation, in particular a drilling, milling, reaming or grinding tool, the tool holder comprising a clamping shank which, at one end region, has a clamping formation for securing the tool coaxially and, at its other end region, has a coupling formation for coaxial coupling to a machine tool.

Such tool holders are generally known, for example, as clamping chucks or clamping spindles in drilling, milling, reaming or grinding machines, i.e. generally in machines which carry out material-removing machining using rotating, geometrically defined or undefined cutting edges. The clamping formation may have an accommodating opening which is central in relation to the axis of rotation and intended for accommodating a retaining shank of the tool, it being possible to provide, on the lateral circumference of the accommodating opening, at least one clamping surface for securing a retaining shank of the tool. The known tool holders usually cover certain axial lengths, which renders them susceptible in principle, to externally induced vibrations, which may come from any number of sources.

For example, numerous cutting tools which are provided for clamping into such a tool holder have at least one cutting edge on their outer surface or have a plurality of cutting edges distributed uniformly over their circumference, so that, during tool rotation, periodically at least one cutting edge enters into the body of the workpiece in order to remove material therefrom. The action of the cutting edge entering into the material in this way subjects the cutting edge to a force of reaction since it changes more or less abruptly from a non-cutting state into a cutting state. The periodicity of such impulses here depends on the number of cutting edges present and on the speed of rotation of the tool and thus of the tool holder. However, other vibration-inducing influences are also known, such as those obtained, for example, by a cutting speed which is unsuitable for a respective tool, for example by a milling cutter rattling.

These influences can cause the tool holder to undergo torsional vibration about its ideal axis of rotation and/or transverse vibration in a plane which contains the axis of rotation. Combinations of such vibrations also occur.

The object of the present invention is thus to specify a tool holder of the type mentioned in the introduction which, in relation to the prior art, is generally less susceptible to undergoing undesirable vibration and therefore achieves higher levels of machining accuracy.

The object of the present invention is achieved by a tool holder of the type mentioned in the introduction which is characterized in that connected to the clamping shank is a bracing arrangement which, in an axial bracing section of the clamping shank, subjects the clamping shank to a bracing force with a bracing-force component acting in the axial direction, it being the case that, in the bracing section, at least one of the components—clamping shank and bracing arrangement—is designed as a sleeve which encloses the respectively other component coaxially.

According to the present invention, the tool holder can be subjected to the bracing force in any desired direction as long as the force has a bracing-force component acting in the axial direction, i.e. in the direction of the axis of rotation. Persons skilled in the art, however, will understand that the effect which can be achieved by a bracing arrangement according to the invention becomes greater as the fraction of the axially acting bracing force component forming part of the overall bracing force increases.

The coupling formation may be any type of conventional tool-holder coupling, e.g. a steep-taper coupling shank or a hollow-shank coupling (HSK coupling). It is likewise the case that the clamping formation may be any type of tool-clamping device, e.g. a shrink-fit chuck mount, a tool mount for a straight shank with a clamping screw, for example, of the Weldon type or Whistle-Notch type. However, draw-in collet chucks or so-called combined mounts or mounts for drilling or cutting heads are also suitable.

The axial bracing force component produces, in the axial bracing section, mechanical axial stressing which changes, preferably increases, the resilient properties of the tool holder, in particular the resilient strength thereof, in the axial section, and thus of the tool holder as a whole, in relation to the mechanically non-braced state. Applying the axial stressing thus makes it possible specifically to change, in particular increase, the resilience of the tool holder as a whole and therefore the forms of vibration which can be induced particularly easily on the tool holder, and the resonant frequencies associated with these forms of vibration. As is known in general, the resonant frequency of a component, e.g. of a tool holder, is determined from the square root of the quotient of resilience and mass. A specific change to the resilience can specifically influence both the torsional-vibration behavior, i.e. in respect of a vibration of the tool holder about an axis of rotation, and the transverse-vibration behavior, i.e. in respect of a vibration of the tool holder in a plane which contains the axis of rotation, with vibrational deflection of the tool holder orthogonally in relation to the axis of rotation. It has also been found that, in the case of high mechanical stress in the elastic region of metallic materials, in some cases, the damping can increase.

The mechanical axial stressing to which the tool holder is subjected by the sleeve of the bracing arrangement may be in the form of tensile stressing or compressive stressing. The bracing section here is preferably arranged in the axial direction between the clamping formation and the coupling formation, in particular when the clamping formation projects beyond the sleeve and is designed for securing the tool with a shrink fit. As a result of these measures, the coupling formation and the clamping formation may be designed to be sufficiently stiff, and the clamping formation is accessible for inductive heating appliances, if appropriate, for shrink-fit engagement and disengagement of the tool.

In a first variant it is provided that the sleeve is supported on the tool holder at its ends such that the latter can be pushed away from one another under tensile loading, and the clamping shank connects the coupling formation to the clamping formation such that it can be subjected to compressive loading.

As an alternative, however, it is also possible for the sleeve to be supported on the tool holder at its ends such that the latter are pushed toward one another under compressive loading, and for the clamping shank to comprise a shank section which connects the coupling formation to the clamping formation, such that it can be subjected to tensile loading.

Suitable annular shoulders may be provided on the tool holder in order to support the sleeve such that it can be subjected to tensile or compressive loading. However, it is also possible for the sleeve to be fixed to the tool holder, for example, by welding or soldering or the like at one or both of its two ends. It goes without saying, however, that the sleeve may also be connected integrally to the coupling formation and/or the clamping formation. Fixed connections of this type result in durable tool holders which can be subjected to high levels of loading. In particular, the subsequent fixed connection, for example by welding or the like, may be provided during the bracing operation, which significantly simplifies the design of the tool holder.

The tool holder is expediently designed such that it is possible to change the bracing force, so that, depending on the application case, i.e. taking account of the number of cutting edges present on a cutting tool, of the rotational speed of the tool holder, etc. the bracing force can reduce the likelihood of the tool holder undergoing undesirable vibration. In order to change the bracing force, the supporting path of the sleeve or of the shank section of the clamping shank can be guided via an axial screw-connection. Instead of the screw-connection, however, it is also possible to provide press-fit connections which allow axial adjustment by way of external axial compressive forces. Finally, a hydraulically acting pressure chamber may be provided in the supporting path, it being possible to adjust the hydraulic pressure in this pressure chamber in order to change the bracing force.

The clamping shank and/or the sleeve has to be connected in a rotationally fixed manner to the coupling formation and the clamping formation in order for it to be possible for the drive torque of the machine tool to be transmitted to the tool. The intention is for the tool holder to be flexurally stiff in relation to its axis of rotation. This can be achieved, with sufficient damping properties, if the sleeve is supported on an annular coupling-formation shoulder which stiffens the clamping formation, in particular on a radially projecting annular collar of the coupling formation, or is connected to this annular shoulder. The annular shoulder stiffens the coupling region of the sleeve. Since the external diameter of the annular shoulder is usually larger than the external diameter of the clamping formation, it is possible for that end of the sleeve adjacent to the coupling formation to be increased in terms of external and/or internal diameter in relation to the other end. The resulting, more or less conical shape of the sleeve improves the flexural stiffness of the tool holder.

That section of the clamping shank which is encased by the sleeve may likewise be in sleeve form. In particular, it is also possible for the sleeve itself to comprise a plurality of sleeve shells which are arranged coaxially in relation to one another, and, at least over part of their axial length, can butt against one another in a frictionally fitting manner. The resulting friction has a damping effect on the vibratory movements which cause the same. It is also possible for one of the sleeve shells to be subjected to compressive loading and for the other of the sleeve shells to be subjected to tensile loading, so that the inner sleeve shell performs the function of the shank section of the clamping shank.

Furthermore, the sleeve, or at least one of its sleeve shells, can butt against the tool at least one axial end region, preferably at both axial end regions, with the interposition of a damping element. The abutting engagement in turn, allows a micro-movement of the sleeve relative to the damping element and/or of the damping element relative to the tool holder so that undesirable movements of the tool holder relative to the sleeve are damped. This also prevents undesirable vibration from occurring. Furthermore, the damping element ensures that blows to the tool holder, as may be produced, for example, by material-removing machining of workpieces, are damped. This is not the case even with a connection between the sleeve and damping element, and/or between the damping element and tool holder, which goes beyond mere abutment.

As an alternative, or in addition, however, the tool holder may also be designed such that there is formed radially between the sleeve and the shank section, an annular space which is filled with a material which is subjected to pressure, in particular, with a free-flowing material or a plastically deformable or elastic material. Pressure-changing means are preferably provided and can be used to change the pressure of the material in the annular space. The material which is subjected to pressure not only influences the axial bracing force; in the case of internal friction, it can also increase the damping action. The pressure-changing means may be means for changing the volume, for example, an adjusting screw which can be displaced into the volume and/or a displaceable piston.

The previously explained bracing arrangement changes the resilient characteristics of the tool holder, which is subjected to both torsional vibration and bending vibration during operation, and thus the vibration behavior of the tool holder. In some cases, just changing the vibration behavior can result in an improvement in the cutting properties of the tool and thus an improvement in the service life of the tool. A significant improvement in the damping properties of the tool holder, however, can be achieved if the tool holder is assigned energy-absorbing or energy-consuming means. In a preferred configuration of the invention, it is provided that, at least over part of its axial length, the sleeve, which produces the prestressing force, butts against the circumference of the clamping shank in a frictionally fitting manner. When the clamping shank undergoes torsional or bending vibration, the sleeve, which is connected to the tool holder merely at its axial ends, moves relative to this clamping shank and, by virtue of its friction fit damps this vibration. The friction fit can be realized by oversize dimensioning of the abutting circumferential surfaces of the clamping shank, on the one hand, and of the sleeve, on the other hand, for example, in a configuration in which the sleeve encloses the clamping shank in a state in which the external diameter of the clamping shank is oversized in the radial direction in relation to the internal diameter of the sleeve. It is also possible, however, for the radial forces which are necessary for the friction fit to be produced in some other way, for example, by elastic material being forced in between the radially opposite circumferential surfaces of the clamping shank on the one hand, and of the sleeve, on the other hand.

It has been found that the friction-fit section need not extend over the entire axial length of the sleeve, rather it is sufficient to limit the friction fit to part of the sleeve, in particular to the region of one its axial ends, so that the rest of the axial length of the sleeve can be utilized for the resilient axial bracing. In a preferred embodiment, which is particularly straightforward in design terms, the last-mentioned principle is utilized, at the same time, for supporting the sleeve axially on the clamping shank. The sleeve, which has its two ends supported on the tool holder in an axially prestressed manner, has its end which is axially in the vicinity of the clamping formation retained on the clamping shank in a frictionally fitting manner with press-fit action, preferably in a friction-fit section. The axial length of the friction-fit section is such that this section can also absorb the axial prestressing force of the sleeve, but can develop its friction-damping properties in the direction of the other end of the sleeve.

When the sleeve is mounted on the clamping shank of the tool holder, the sleeve is prestressed under compressive loading, for example in a pressing apparatus, the press-fit action being overcome in the process. In order for it not to be necessary for the sleeve to be pushed on under press-fit conditions over the entire axial height of the friction-fit section, the sleeve and the clamping shank adapted to one another at least over part of the friction-fit section, are of slightly conical form, for example with a slope of approximately 0.1. Such a conical shape is self-locking. It goes without saying, however, that the friction-fit section itself, but also for complying with press-fit conditions, may also be formed by cylindrical surfaces.

The sleeve, which is thus pulled on to the clamping shank under compressive prestressing, has its other end supported axially on an annular shoulder of the tool holder, in particular, on an annular shoulder of the coupling formation. In this context, it has been found to be expedient for that end of the sleeve which is supported on the annular shoulder to be defined as a conical section which tapers axially away from the annular shoulder and thus, in addition, ensures that the clamping shank foot, which is adjacent to the coupling formation is stiffened.

As has already been mentioned, the sleeve, which is prestressed axially under compressive loading, expediently runs axially between the friction-fit section and the other end, which is directed toward the coupling formation and is supported on the tool holder, with radial spacing from the clamping shank, in order for the sleeve to be capable of movement in its section which produces the prestressing. In the axial direction between the friction-fit section and the other end, which is supported on the tool holder, at least one damping ring made of an elastically compressible material may be arranged between the circumference of the clamping shank and the inner lateral surface of the sleeve, so that this region of the sleeve can also be utilized for energy-absorbing vibration-damping purposes. For example, such a damping ring may be accommodated in the abovementioned conical section of the sleeve.

In a further preferred configuration, it is provided that the axial ends of the sleeve are connected in a tension-resistant and sealed manner to the tool holder, in particular are friction-welded thereto, the sleeve enclosing the clamping shank with radial spacing, so that an outwardly sealed annular chamber is produced between the sleeve and the clamping shank. For the axial bracing, a deformable material, which absorbs the vibration energy as it deforms, is introduced, for example, injected, into this chamber under pressure, the material being free-flowing or deformable at least during the filling operation and then changing its consistency while maintaining the pressure. Examples of suitable materials here are free-flowing rubber compounds which vulcanize fully in the annular chamber or else curable plastic substances which cure in the annular chamber to form a rigidly elastic annular body. Materials which can be sintered in the annular chamber, for example ceramic materials, are also suitable. The damping materials explained above may contain fillers which increase the mechanical strength or stiffness of the damping material.

In a further variant, which is based on the principle of hydraulic pressure production for the axial bracing of the bracing arrangement, it is provided that the sleeve has its two ends supported axially on the tool holder, there being arranged in the supporting path of one of the two ends of the sleeve a supporting device which can be moved axially relative to the tool holder and has at least one supporting piston which is guided in an axially displaceable manner in an associated pressure chamber, which contains a free-flowing or a plastically deformable medium, the pressure chamber being assigned an adjusting element for changing the pressure in the pressure medium. For space-related reasons, the pressure chamber is preferably arranged on the coupling formation side of the tool holder and may comprise a multiplicity of circumferentially distributed, axially movable pistons which act on the adjacent end of the sleeve. The pistons are expediently arranged in separate pressure chambers which nevertheless communicate with the pressure medium. However, the supporting piston is preferably an annular piston which is central in relation to the axis of rotation and can be displaced axially in an annular space forming the pressure chamber. The annular piston may be separate from the sleeve; however, it may also be connected integrally thereto.

The pressure medium may be hydraulic oil or some other non-compressible liquid. However, free-flowing, plastic materials, for example rubbery or free-flowing plastics or viscoelastic substances are also suitable.

Here too, the adjusting element may be a piston screw or the like which acts on the pressure medium.

The other of the two ends of the sleeve may be fixed, for example, welded or adhesively bonded, to the clamping shank. However, a securing ring which is retained in a releasable manner on the clamping shank is preferably provided on the annular collar for supporting the other end of the sleeve. The securing ring may be a nut which is screwed on to the clamping shank, or else a lock washer which is snap-fitted radially elastically into an annular groove of the clamping shank.

It goes without saying that it is possible to optimize the resilient properties of the sleeve by virtue of the wall thickness of the latter being suitably selected. It is also possible to influence the resilient properties by virtue of the sleeve being suitably configured. For example, the sleeve may comprise an axially resilient zigzag-spring section.

In order to reduce undesirably occurring vibration, it is possible to provide, on the tool holder, an oscillating-weight element which uses destructive resonance to reduce, or even eliminate undesirable vibration on the tool holder. The oscillating-weight element is preferably arranged in an axially displaceable manner on the tool holder so that its resonant frequency can be coordinated with the resonant frequency of the tool holder. The oscillating-weight element is preferably provided on the shank of the tool holder since the undesirable forms of the vibration preferably form thereon. Furthermore, the oscillating-weight element may be encapsulated by the abovementioned sleeve, for example, if the latter encases the shank in the radially outward direction. The oscillating-weight element is thus protected against external influences, for example, the occurrence of chips or swarf and coolant.

In a further preferred configuration it is provided that, at least over part of its axial length, the sleeve encloses the shank section with radial spacing to form an annular space, and arranged in a radially prestressed manner in the annular space is an annular damping element which is in surface abutment against the inner circumferential surface of the sleeve and the outer circumferential surface of the shank section. Such a damping element ensures a defined friction fit between itself and the sleeve, on the one hand, and the shank section, on the other hand, and thus provides for friction damping. The damping element may consist of essentially stiff material, but preferably consists of elastic or plastic material, so that the internal friction of this material also aids damping, even if the damping element is connected in a rotationally fixed manner to the circumferential surfaces of the sleeve and of the shank section. The damping element can be forced into the annular space in a compressed state. However, the annular space is preferably bounded axially by annular shoulders, between which the damping element is braced axially in order to produce the radial prestressing. By changing the axial spacing between the annular shoulders, it is possible to vary the prestressing of the damping element. For this purpose, for example, one of the annular shoulders may be formed by an axially displaceable screw connection arrangement which is retained on the coupling formation. The annular space is preferably conical, so that, even in the case of relatively stiff materials, it is possible to change the radial bracing of the damping element.

In general terms, it has proven to be particularly advantageous if the two components, i.e. the clamping shank on the one hand, and the bracing arrangement, on the other hand, consist of different materials, since the vibrations can be damped to better effect if they have to pass through regions made of different materials. One of the components, in particular the sleeve, expediently consists of hard metal. The hard metal may be fine-grained, for example, of the K20 type, but also coarse-grained, for example, of the K50 type, since coarser-grained hard metals are stronger and less brittle. Heavy metals or metal matrix composite materials (MMC materials), for example ferrotitanite, are also suitable, as are ceramic materials but also plastics, in particular glass-fiber-reinforced or carbon-fiber-reinforced plastics.

The embodiments which have been explained above are ones in which the two components, i.e. the clamping shank and the bracing arrangement, are connected integrally to one another, if appropriate by welding. Embodiments which have also proven to be particularly favorable, however, are ones in which one of the two components—clamping shank and bracing arrangement—is supported on the other of the two components via at least one joint which transmits the axial bracing force. Joints have different force-transmitting behaviors depending on whether the abutting surfaces are subjected to tensile or compressive loading, and thus, on account of this lack of symmetry in force transmission, ensure vibration reduction. The joint may be provided between two circumferential surfaces of the two components which butt against one another with radial press-fit action and/or between two axially abutting surfaces of the two components. If appropriate, a damping material layer may be arranged between the two joint-forming surfaces.

It has proven to be significant, for the purpose of reducing vibrations, if the two components are centered radially relative to one another in the region of the joint, in which case there should preferably be a certain slight press-fit action between the centering circumferential surfaces. At least one of the two axial ends of the sleeve-forming components should form one of the abutting surfaces of the joint, and a circumferential surface is expediently integrally formed, or fitted, on the other of the two components, and centers the sleeve radially in the region of this end. It is expedient for both ends of the sleeve to be centered radially in this way.

The sleeve may be centered on its radially inner circumferential surface. In particular that axial end of the sleeve which is adjacent to the clamping formation, however, is expediently centered on its radially outer circumferential surface, since thermal expansions of the clamping formation then do not subject this end of the sleeve to compressive loading. Specifically in the case of shrink-fit chuck designs, the widening of the end of the sleeve by the thermally expanding shrink-fit chuck may result in damage to the sleeve, specifically when the latter consists of a brittle material, for example ceramic or the like. It is also the case that that end of the sleeve which is adjacent to the coupling formation is expediently centered on its outer circumferential surface since, in this way, expanding forces which may be produced, for example, as a result of the conical shape of the sleeve can be taken up by the external centering.

The outer, centering circumferential surfaces may be integrally formed on the component enclosing the sleeve on the outside. However, the precise production of an inner fit formation on this component requires high outlay on account of the undercut which is present there. An embodiment which is more straightforward to produce is one in which that circumferential surface of the other of the two components which encloses the sleeve in the radially outward direction in the region of at least one of its ends, in particular, in the region of its end which is adjacent to the clamping formation, is formed by a ring which covers over the joint axially and also encloses the other component in the radially outward direction. The inner fitting surface of such a ring is comparatively straightforward to produce.

Exemplary embodiments of the invention are explained in more detail hereinbelow with reference to drawings, in which.

Figure 1:
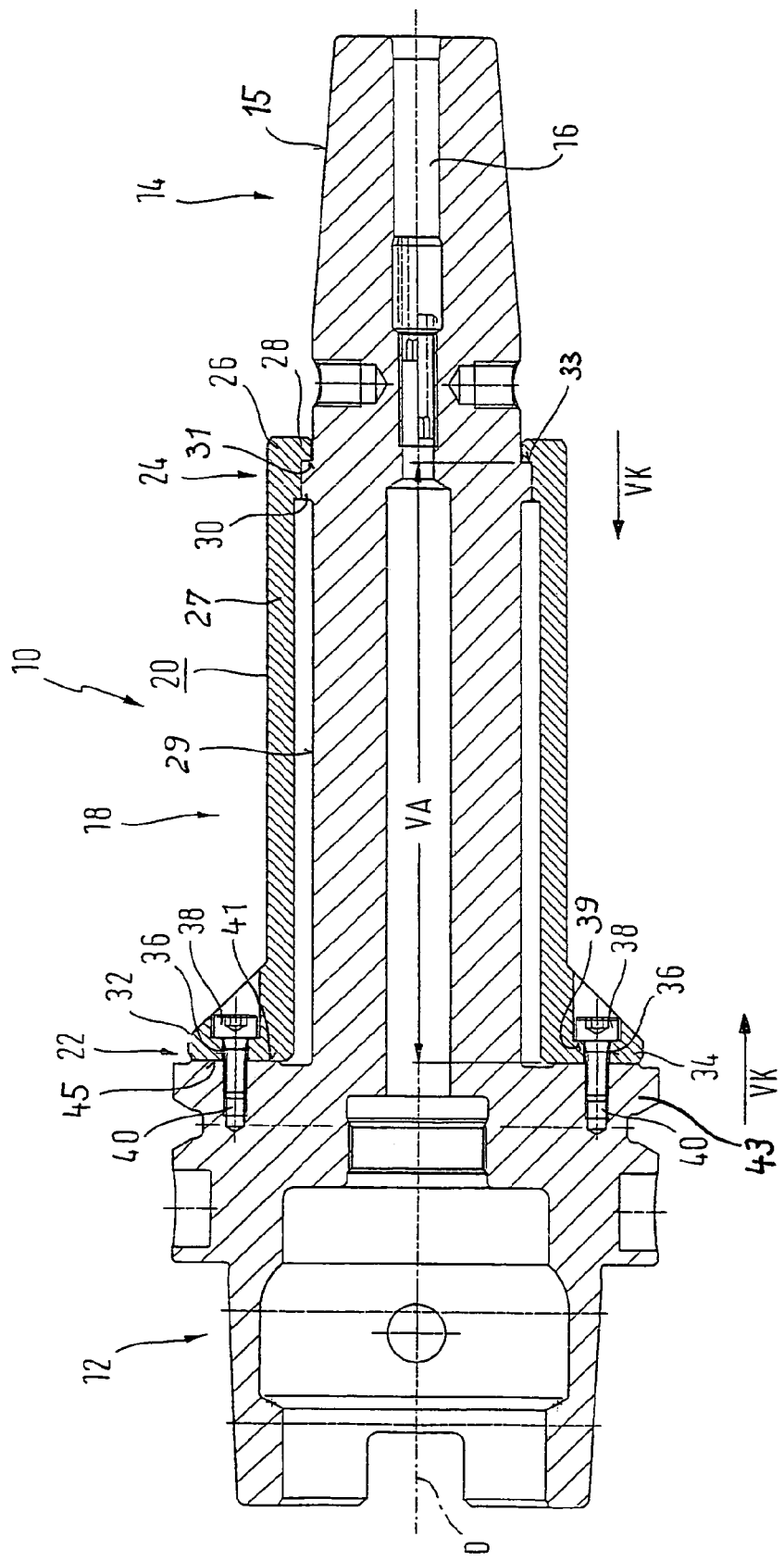
FIGS. 1 to 7 show axially directed longitudinal sections through vibration-damped tool holders with a sleeve which is braced axially under tensile loading.

A first embodiment of a tool holder according to the invention is designated in general terms by 10 in FIG. 1. At its left-hand end region, as in FIG. 1, the tool holder 10 has a coupling formation 12 for coupling the tool holder 10 to a machine tool (not illustrated) in the manner known per se. The coupling formation 12 coupled to the machine tool transmits torque from the rotary drive of the machine tool to the tool holder 10.

At its longitudinal end which is opposite to the coupling formation 12, the tool holder 10 has a clamping formation 14 which has a clamping recess 16, which in the example shown is cylindrical and into which a shank of a tool can be introduced and clamped securely there. In the example which is shown in FIG. 1, the tool holder 10 serves for shrink-fit clamping purposes. The clamping formation 14 is thus heated on its outer circumferential surface 15 in the region of the clamping recess 16, so that the clamping formation expands thermally and the diameter of the clamping recess 16 increases. In this heated state, the shank of a tool is introduced into the clamping space 16, whereupon the tool holder 10 is cooled, or can cool, in the region of the clamping formation, so that between the tool shank and the clamping formation 14, by virtue of the cooling-induced shrinkage of the clamping formation 14, the tool holder is secured with press-fit action in the clamping recess 16. Such tool holders are known in general from the prior art.

The tool holder 10 can be rotated about an axis of rotation D and, furthermore, is essentially symmetrical in relation to this axis of rotation D. All the axis-related directions given in this application are related to the axis of rotation D. This applies to an axial direction, a circumferential direction and a radial direction.

In an axial shank section 18 located between the coupling formation 12 and the clamping formation 14, the tool holder 10 is encased coaxially by a sleeve 20. The sleeve 20 is supported on the tool holder 10 at two axially-spaced apart supporting locations 22 and 24. The supporting location 22 in FIG. 1 is the supporting location which is in the vicinity of the coupling formation 12, while the supporting location 24 is located closer to the clamping formation 14. The supporting locations 22 and 24 extend around the tool holder 10. At its right-hand longitudinal end 26, as seen in FIG. 1, the sleeve 20 has an encircling radial protrusion 28 which projects radially inward from the sleeve body 27.

This radial protrusion 28, along the circumference of the tool holder 10, is in abutting engagement with a shoulder or collar 30 which runs around the tool holder 10 and projects radially outward starting from the essentially cylindrical lateral surface 29 of the shank section 18. More precisely, an abutment surface 31 of the radial protrusion 28 of the sleeve 20, this abutment surface being oriented essential orthogonally in relation to the axis of rotation D and in the direction of the coupling formation 12 in the mounted state of the encircling sleeve 20, butts against an end surface 33 of the collar 30, this end surface likewise being essentially orthogonal in relation to the axis of rotation D and being oriented in the direction of the clamping formation 14. This abutting contact between the joint-forming surfaces 31 and 33 makes it possible for an axially acting bracing force VK which is directed toward the coupling formation 12 to be transmitted to the tool holder 10 at the supporting location 24.

At its longitudinal end 32, which is in the vicinity of the coupling formation 12, the sleeve 20 has a radially outwardly running radial flange 34. The radial flange 34 is provided, in the circumferential direction, with a plurality of through-bores 36 which are spaced apart from one another at equal angles. Guided through these through-bores 36 are screws 38 of which the screw head rests on a bearing surface 39 of the radial flange 34, this bearing surface being essentially orthogonal to the axis of rotation D and being oriented in the direction of the other longitudinal end 26.

The screws 38 are screwed into internally threaded blind holes 40, associated with the through-bores 36, in the tool holder 10.

By virtue of the screws 38 being tightened and being supported on the radial flange 34 of the sleeve 20, an axially acting bracing force VK which is directed toward the clamping formation 14 can be transmitted at the supporting location 22 via the internal thread of the blind holes 40. Selecting the tightening torque of the screws 38 makes it possible to adjust the magnitude of the bracing force VK. For this purpose, it is possible to leave a gap between the abutment surface 41 of an annular collar or annular flange 43 which projects radially from the coupling formation 12, this abutment surface being essentially orthogonal to the axis of rotation D and being oriented in the direction of the clamping formation 14, and the end surface 45 of the radial flange 34 of the sleeve 20, this end surface likewise being orthogonal to the axis of rotation D and being oriented in the direction of the coupling formation 12.

For the straightforward adjustment of a predetermined bracing force, it is, however, possible, according to one embodiment of the invention, to provide two abutment surfaces on the tool holder such that the axial spacing between them is larger than an axial spacing between the mating abutment surfaces of the sleeve which are assigned to the abutment surfaces as seen in the non-mounted state of the sleeve. In the example of FIG. 1, the axial spacing between the abutment surfaces 33 and 41 is approximately 0.3 to 0.5 millimeters larger than the spacing between the mating abutment surfaces 31 and 43. The screws 38 are then simply tightened until the surfaces 41 and 43 butt against one another. The resulting material expansion of the sleeve causes the bracing section VA to be subjected to a predetermined bracing force.

The abovedescribed bracing force VK which occurs at the supporting location 24 is a bearing reaction force to the bracing force VK which is produced by virtue of the screws 38 being tightened, as a result of which the bracing forces VK which occur at the respective supporting locations are equal in magnitude and opposite in terms of direction. The bracing section VA, which is located between the supporting locations 22 and 24, is thus subjected to increased axial compressive stressing. The increased axial compressive stressing which acts in the bracing section VA is higher than axial stressing in the axial sections of the tool holder 10 which are axially adjacent to the bracing section. This section VA of increased axial compressive stressing changes the resilience of the tool holder 10 in relation to a non-braced state, so that it is also the case that the forms of vibration which can be induced particularly easily on the tool holder 10, and the resonant frequencies associated with these forms of vibration, change as the resilience changes. This applies to the resonant frequency of both torsional vibration which can be induced on the tool holder 10 in the direction around the axis of rotation D, and transverse vibration in a plane which contains the axis of rotation D. The components which form a bracing arrangement, sleeve 20 and screws 38 can thus influence the resilience of the tool holder 10 such that, for example in the case of the number of cutting edges of a tool which is clamped in the tool holder 10 being known and the operational speed of the tool holder 10 being known, undesirable vibration during operation of the tool holder 10 is more difficult to induce and/or is less likely to occur. As a result, finally, the level of machining accuracy which can be achieved by the tool holder 10, and also the service life of the tool, is increased.

Figure 2:
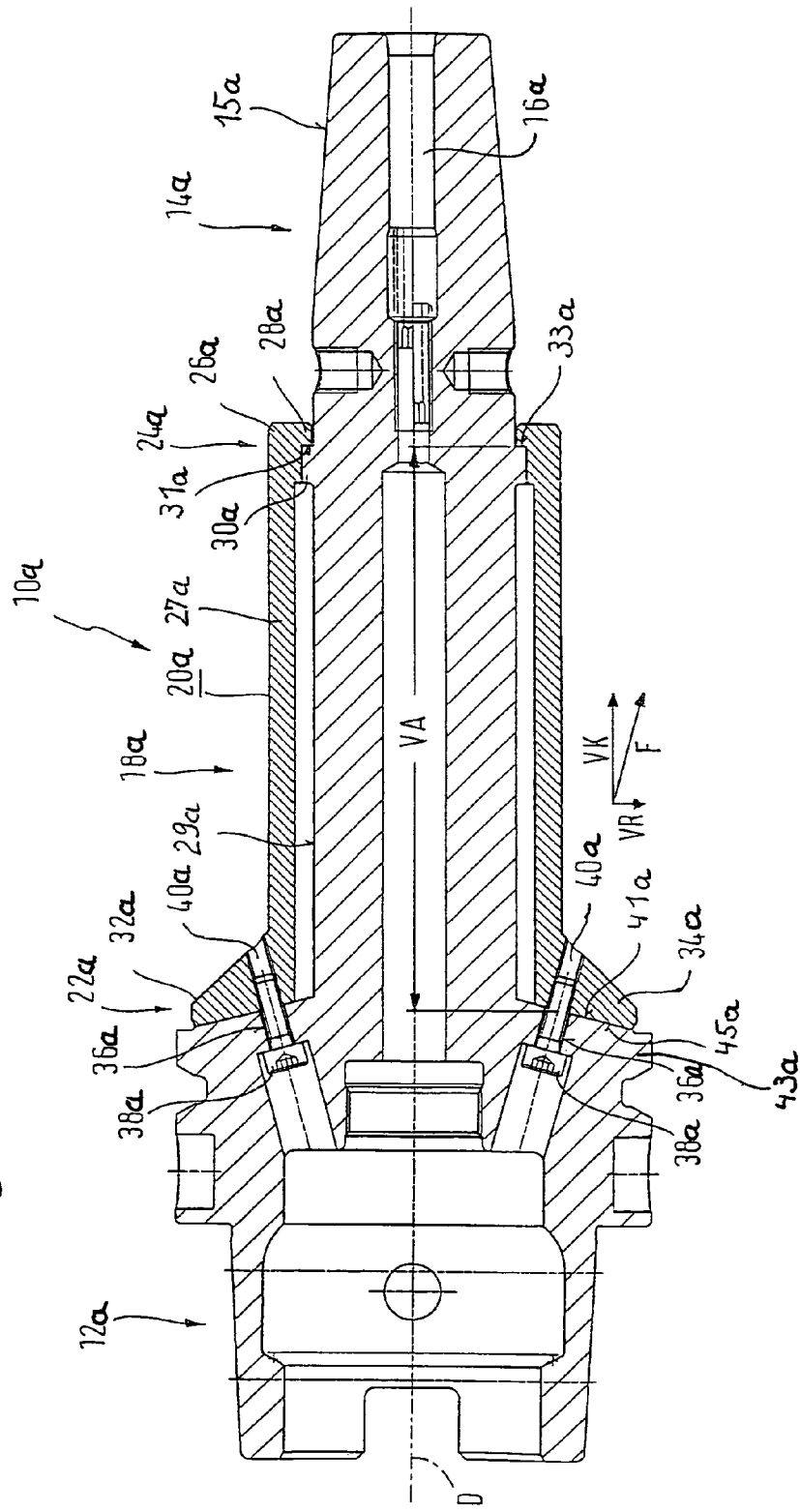

In FIG. 2 and all the figures which follow, the same components are provided with the same designations, and with at least one letter for differentiation purposes. Components are only explained in detail in conjunction with the figure in which they are first illustrated. In respect of these components, reference is expressly made to the description thereof, in the figure in which they first appear. The features of the tool holders which have been illustrated in the figures can be combined with one another in any desired manner.

The embodiment of FIG. 2 corresponds essentially to that of FIG. 1, although, in the case of the embodiment shown in FIG. 2, the screws 38a are plugged through through-bores 36a in the tool holder 10a and are screwed into internally threaded bores 40a in the radial flange 34a.

The longitudinal axis of the screws 38a is inclined in relation to the axis of rotation D. The screws 38a are arranged such that their longitudinal axes, when extended on an imaginary basis, ideally intersect at a point on the axis of rotation D. A force F which acts in the direction of the longitudinal axes of the screws 38a is thus transmitted, by the latter, to the tool holder 10a, this force F having a bracing force component VK in the axial direction and a force component VR in the radial direction. The bracing-force component VK, which produces a corresponding bearing reaction force at the supporting location 24a, in turn subjects the bracing section VA of the tool holder 10a to axial compressive stressing, with the above-mentioned effects.

Figure 3:
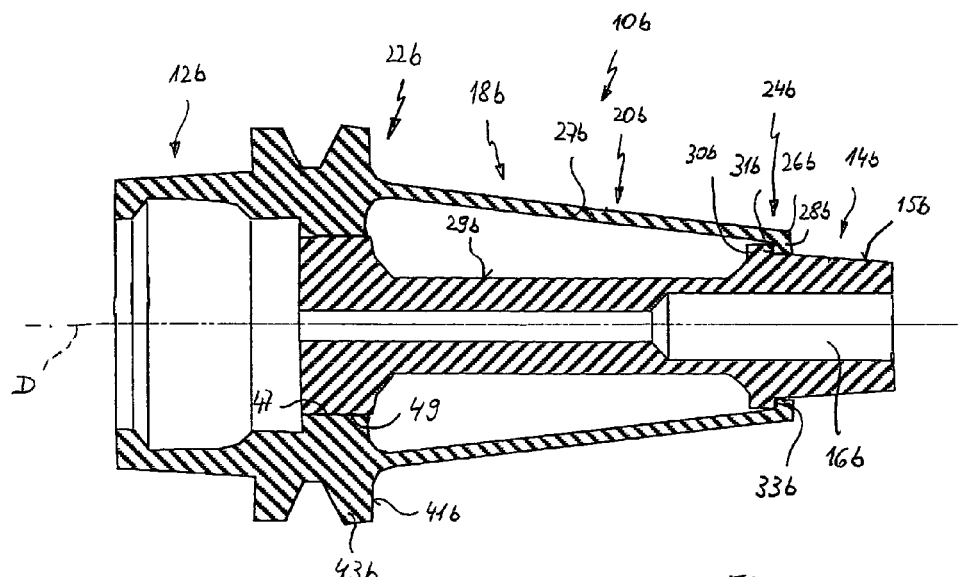

FIG. 3 shows a tool holder 10b, which differs from the tool holders of FIGS. 1 and 2 essentially in that the sleeve body 27b is of essentially conical design, and its larger-diameter end merges integrally at the supporting location 22b, into the supporting surface 41b of the annular flange 43b of the coupling formation 12b. The sleeve 20b which tapers in the direction of the clamping formation 14b, improves the flexural stiffness of the tool holder 10b. The shank section 29b is formed integrally with the clamping formation 14b and the collar 30b and is plugged axially into the sleeve 20b through a cylindrical opening 47 in the region of the annular flange 43 of the coupling formation 12b. Correspondingly, the internal diameter of the opening 47 is somewhat larger than the external diameter of the collar 30b. At the end which is adjacent to the coupling formation 12b, the shank section 29b is provided with a press-fit surface 49, which is retained with radial press-fit action in the opening 47. The fit formation is selected such that the press fit can absorb the axial prestressing force VK of the sleeve 20b, which is subjected to tensile loading.

Figure 4:
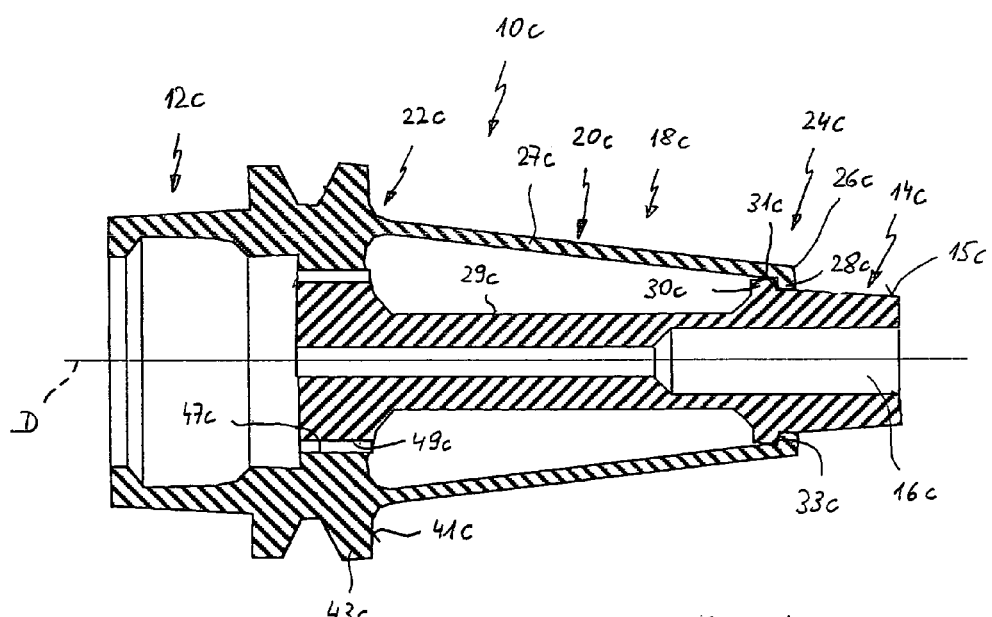

FIG. 4 shows a tool holder 10c, which differs from the tool holder 10b of FIG. 3 essentially only in that, instead of the press-fit surface 49 retained in a frictionally locking manner, with press-fit action in the opening 47, the opening is defined as a threaded opening 47c into which an external thread 49c is screwed axially in a form-fitting manner, this external thread being integrally formed at that end of the shank section 29c which is adjacent to the coupling formation 12c. The tensile force acting axially on the sleeve 20c is adjusted by virtue of the shank section 29c being rotated.

Figure 5:
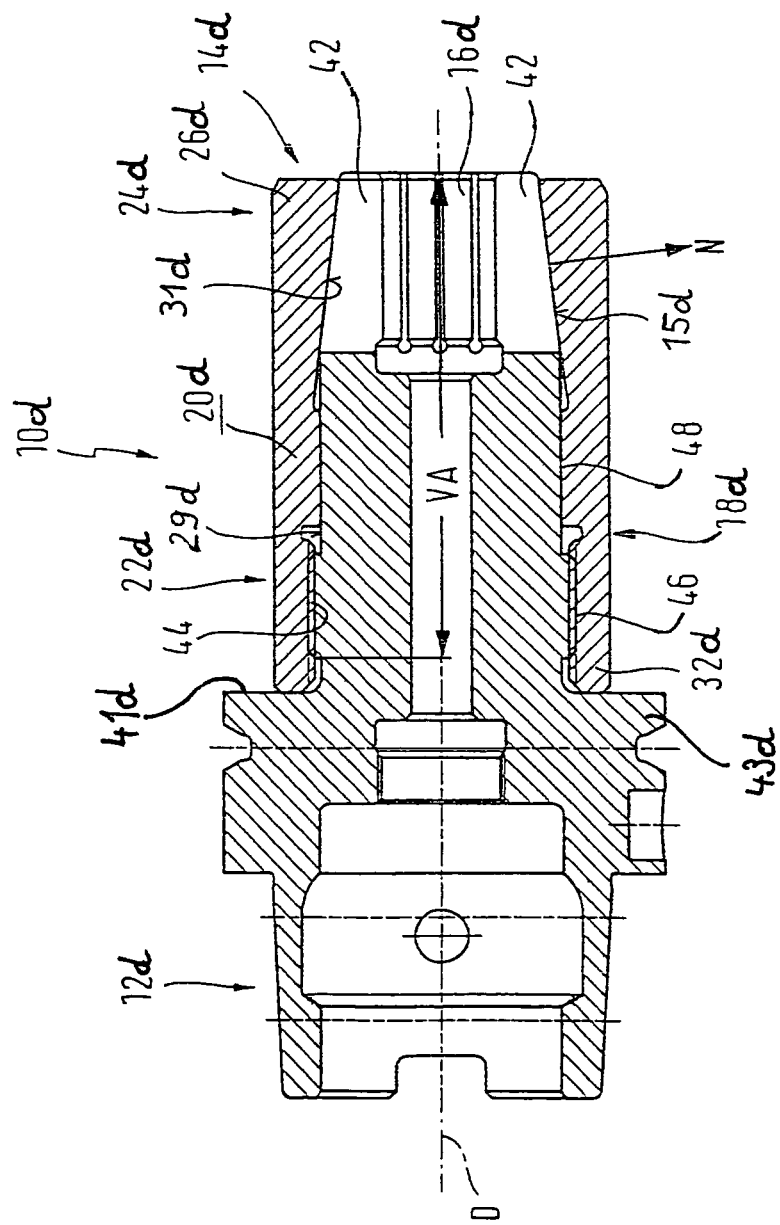

The tool holder 10d, which is illustrated in FIG. 5, is not suitable for the shrink-fit clamping of the tool shanks; rather, it is provided on its clamping formation 14d, with resilient clamping segments 42 which are formed integrally with the tool holder shank 18d. The clamping segments 42 can be displaced by bending, counter to their material elasticity in the direction of the axis of rotation D. The bending force which is necessary for clamping tool shanks in the clamping space 16d is applied by a retaining sleeve 20d. For this purpose, the outer circumference 15d of the clamping formation of the tool holder 10d is designed to taper conically in the direction of that longitudinal end of the tool holder 10d which is in the vicinity of the clamping formation. A surface normal N of the frustoconical lateral surface 15d of the clamping formation 14d thus has a component in the direction of the axis of rotation D and a component in the radial direction.

At its longitudinal end 26d, which is in the vicinity of the clamping formation, the retaining sleeve 20d has a conical inner surface 31d. The conical inner surface 31d has essentially the same inclination as the conical outer surface 15d. The conical inner surface 31d is thus also oriented at least in the axial direction. More precisely, on account of its conicity, the surface (in the mounted state of the retaining sleeve 20d), is oriented on the one hand, in the radial direction toward the axis of rotation D and on the other hand, in the axial direction, toward the coupling formation 12d. The supporting location 24d, which is in the vicinity of the clamping formation, is thus formed by the surfaces 15d and 31d butting against one another.

At a distance from the clamping formation 14d in the axial direction, in the vicinity of the coupling formation 12d, an external thread 44 is provided on the outer circumference 29d of the shank section 18d. An internal thread 46 at the longitudinal end 32d of the retaining sleeve 20d engages with this external thread 44. The threaded engagement between the external thread 44 of the tool holder 10d and the internal thread 46 of the retaining sleeve 20d forms the supporting location 22d, which is in the vicinity of the coupling formation. Screwing the retaining sleeve 20d on to the tool holder 10d thus, on the one hand, transmits the necessary clamping force in the radial direction to the clamping segments 42, and also transmits the axial bracing force component VK, which effects axial compressive bracing in the bracing section VA of the tool holder 10d.

For better centering of the retaining sleeve 20d, an encircling radial collar 48 is formed thereon, in the axial direction between the supporting locations 22d and 24d, this radial collar projecting radially inward and being in surface abutment against the lateral surface 29d of the shank section 18d of the tool holder 10d.

FIG. 6 illustrates, once again, a tool holder 10e with a clamping arrangement 14e for the shrink-fit clamping of tool shanks, as has already been illustrated in FIGS. 1 and 2. There is therefore no need for the retaining sleeve 20e to subject the clamping arrangement 14e to a force in the radial direction. The retaining sleeve 20e is thus not designed for butting against a conical lateral surface. Rather, at its longitudinal end 26e which is assigned to the clamping formation 14e, the retaining sleeve 20e has a radial protrusion 28e which, by way of an abutment surface 31e which, in the mounted state of the retaining sleeve 20e, is oriented in the direction of the coupling formation 12e and is orthogonal in relation to the axis of rotation D, butts against an end surface 50 of the tool holder 10e, said end surface likewise being essentially orthogonal in relation to the axis of rotation D. One supporting location 24e is formed by the abutting engagement of the surfaces 31e and 50. The other supporting location 22e, as in FIG. 5, is formed by the threaded engagement between an external thread 44e of the tool holder 10e and an internal thread 46e of the retaining sleeve 20e.

Figure 6:
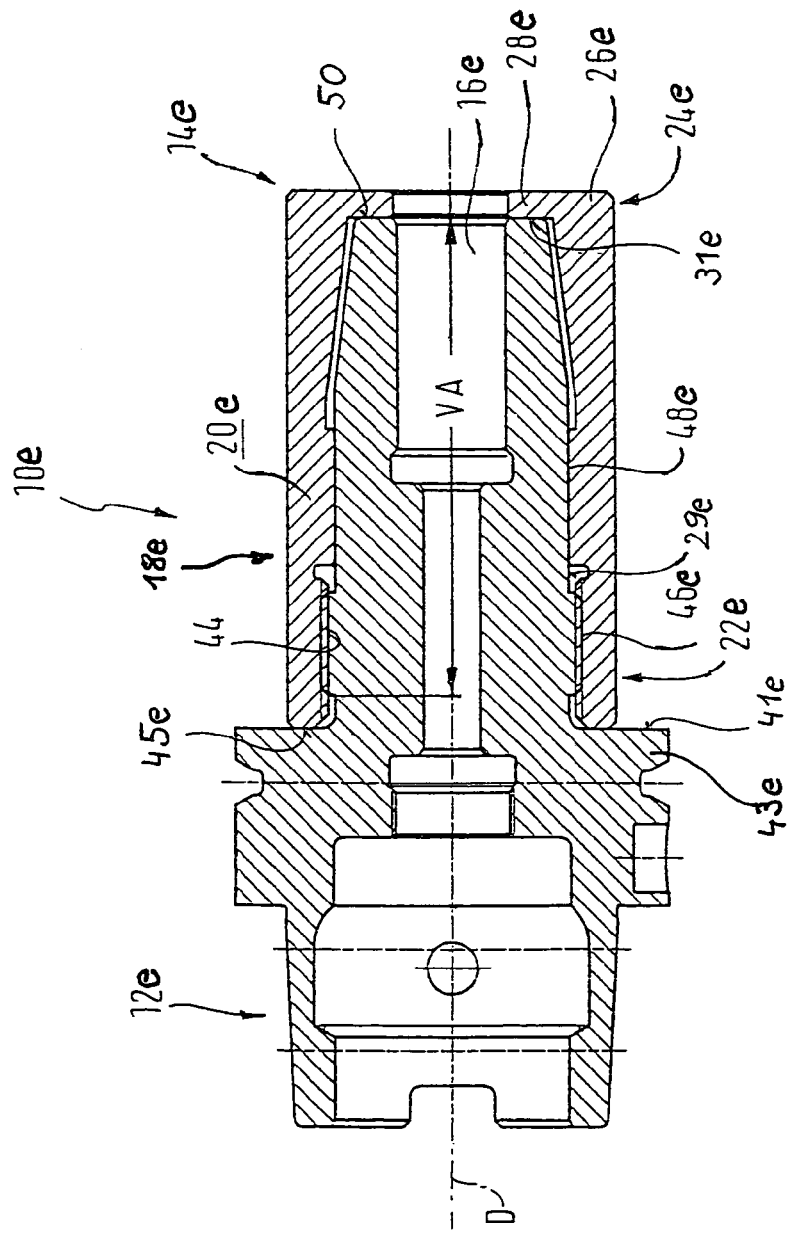

In the embodiments which are shown in FIGS. 5 and 6, the clamping formation 14d and 14e, respectively, is located, at least in part, in the bracing section VA.

Figure 7:
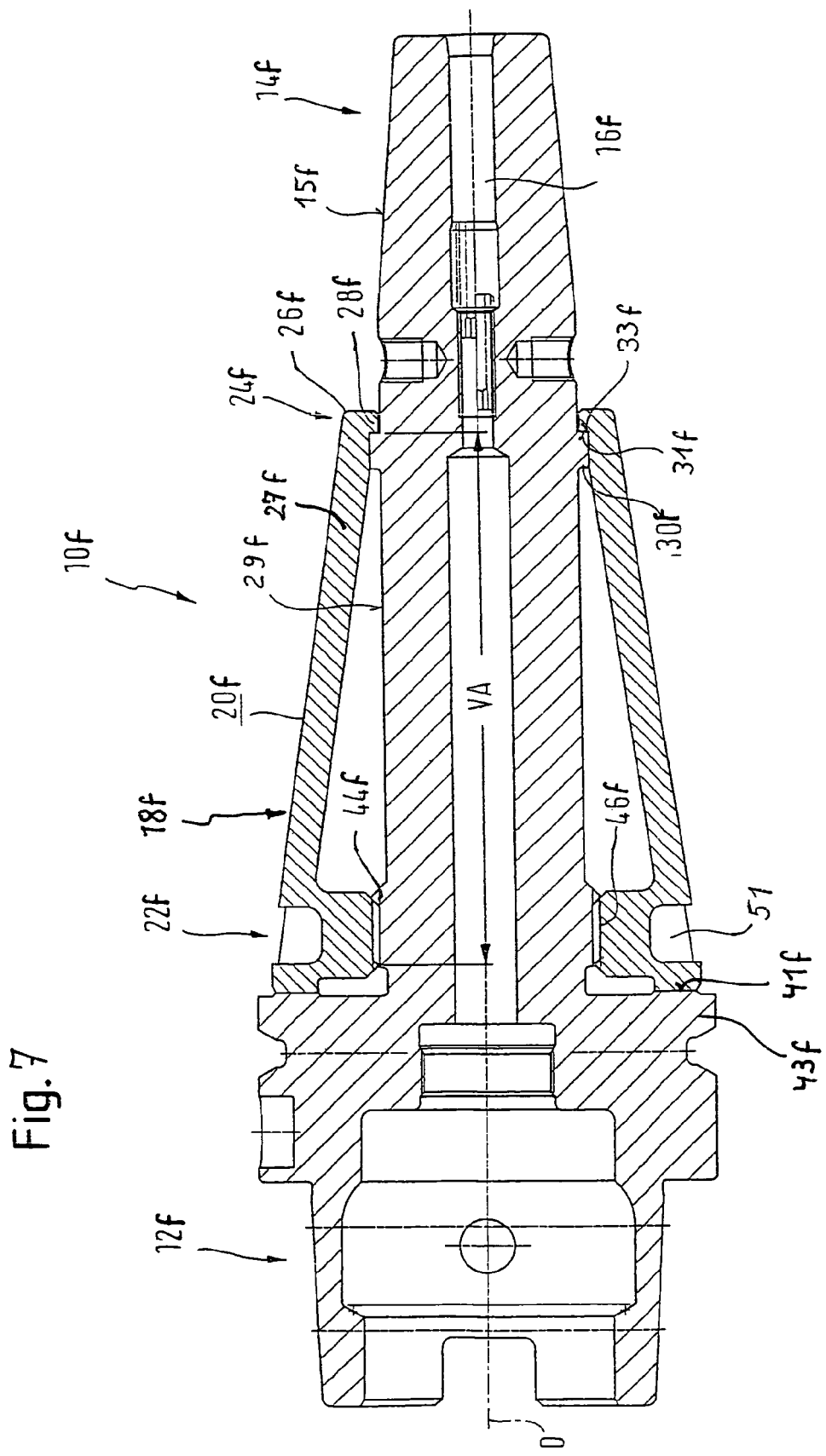

The embodiment of the tool holder 10f, which is shown in FIG. 7, is essentially a combination of the embodiments of FIG. 6 and FIGS. 1 and 2: the supporting location 22f which is in the vicinity of the coupling formation, is formed, as in FIG. 6, by a threaded engagement between an external thread 44f on the tool holder 10f and an internal thread 46f of a sleeve 20f.

In contrast, the supporting location 24f, which is in the vicinity of the clamping formation, is formed in accordance with the embodiments of FIGS. 1 and 2. For a more detailed explanation of the configuration of the supporting locations 22f and 24f, reference is expressly made to the description of FIGS. 1, 2 and 6.

Recesses 51 for tool-engagement purposes are formed in the region of the supporting location 22f, which, together with the supporting location 24f, produces the bracing force which effects actual bracing of the bracing section VA of the tool holder 10f. The bracing force to which the tool holder 10f is subjected can thus be adjusted very precisely.

Figure 8:
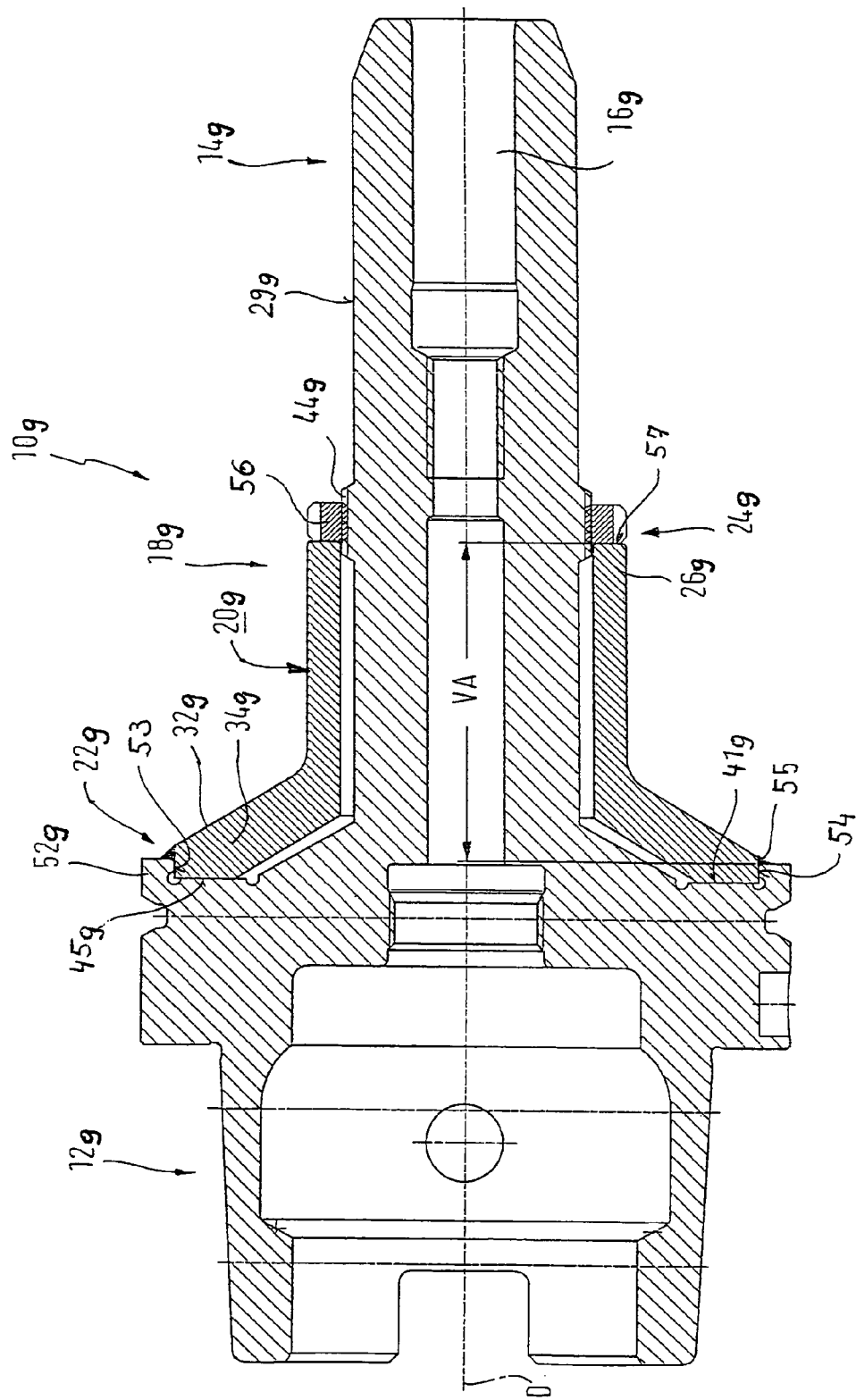
FIGS. 8 to 13 show axially directed longitudinal sections through vibration-damped tool holders with a sleeve which is braced axially under compressive loading.

In FIG. 8, at its longitudinal end 32g, which is in the vicinity of the coupling formation 12g, the sleeve 20g is in abutting engagement with the tool holder 10g. A surface 45g of the radial flange 34g, said surface being orthogonal in relation to the axis of rotation D, butts against a surface 41g on the coupling formation 12g of the tool holder 10g, said surface being orthogonal in relation to the axis of rotation D. Furthermore, in the vicinity of the abutment surface 49g of the coupling formation 12g, a centering collar 52 which encases the radial flange 34g in the radially outward direction, is formed on the tool holder 10g. This centering collar 52 ensures correct coaxial positioning of the sleeve 20g in relation to the tool holder 10g. A radially inwardly oriented centering surface 53 of the centering collar 52 is in abutting engagement with a radially outwardly oriented surface 54 of the radial flange 34g. In order to avoid displacement of the sleeve at the supporting location 22g which is formed in this way, the radial flange 34g and the centering collar 52 are connected to one another in a non-releasable manner by a weld seam 55, which runs around the tool holder.

At the supporting location 24g, an external thread 44g is provided on the lateral surface 29g of the shank region 18g of the tool holder 10g and has an adjusting nut 56g screwed on to it. The adjusting nut 56g pushes, in the direction of the axis of rotation D, on to the end surface 57 of the sleeve 20g, said end surface being essentially orthogonal in relation to the axis of rotation D. Selecting the tightening torque of the adjusting screw 56 makes it possible to adjust the compressive force to which the sleeve 20g is subjected. The bracing section VA of the tool holder 10g can thus be subjected specifically to axial tensile stressing.

In the bracing section VA, the compressive forces acting on the sleeve 20g act as tensile forces of reaction to the tool holder 10g.

In the case of the tool holder 10g in FIG. 8, the coupling formation 12g, the clamping formation 14g and the shank section 18g are formed integrally.

Figure 9:
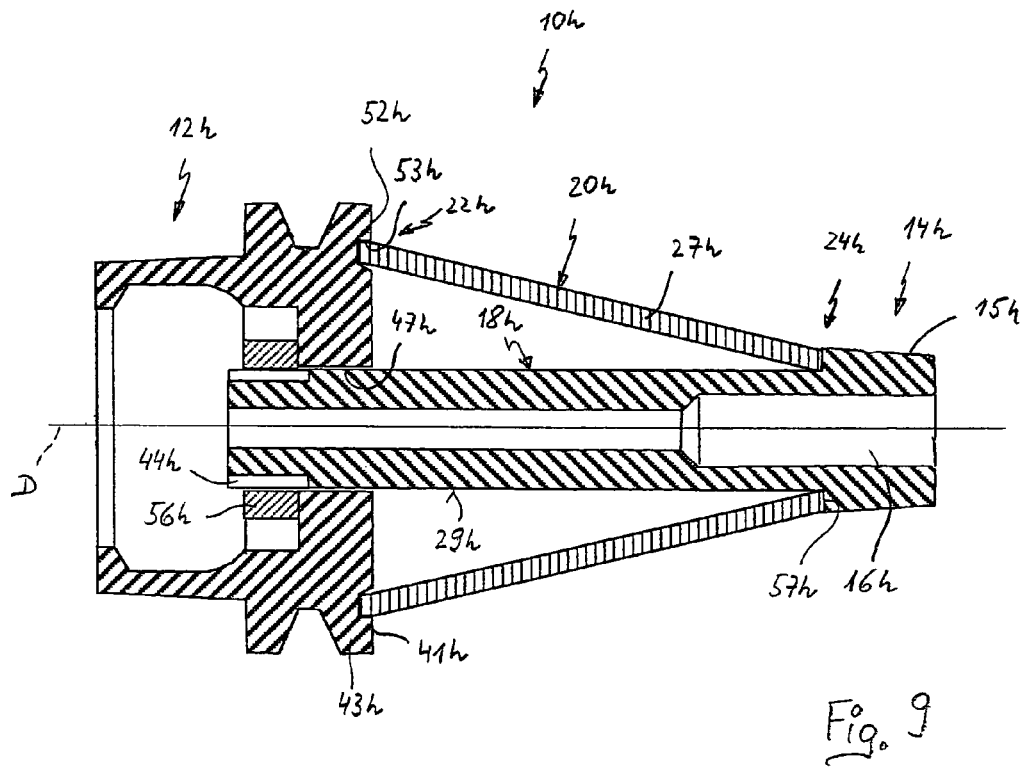

FIG. 9 shows a tool holder 10h, which differs from the tool holder 10g in FIG. 8, essentially in that the shank section 18h, which is formed integrally with the clamping section 14h, passes axially through a central opening 47h of the coupling formation 12h and, on the side which is directed axially away from the clamping formation 14h, bears a threaded nut 56h, which is screwed on to an external thread 44h of the shank section 18h. With the aid of the threaded nut 56h, the, in this case, conical sleeve 20h can be subjected to axial bracing forces. The sleeve 20h is clamped in between radially running, annular end surfaces of the supporting locations 22h and 24h, which are each designed as a joint.

Figure 10:
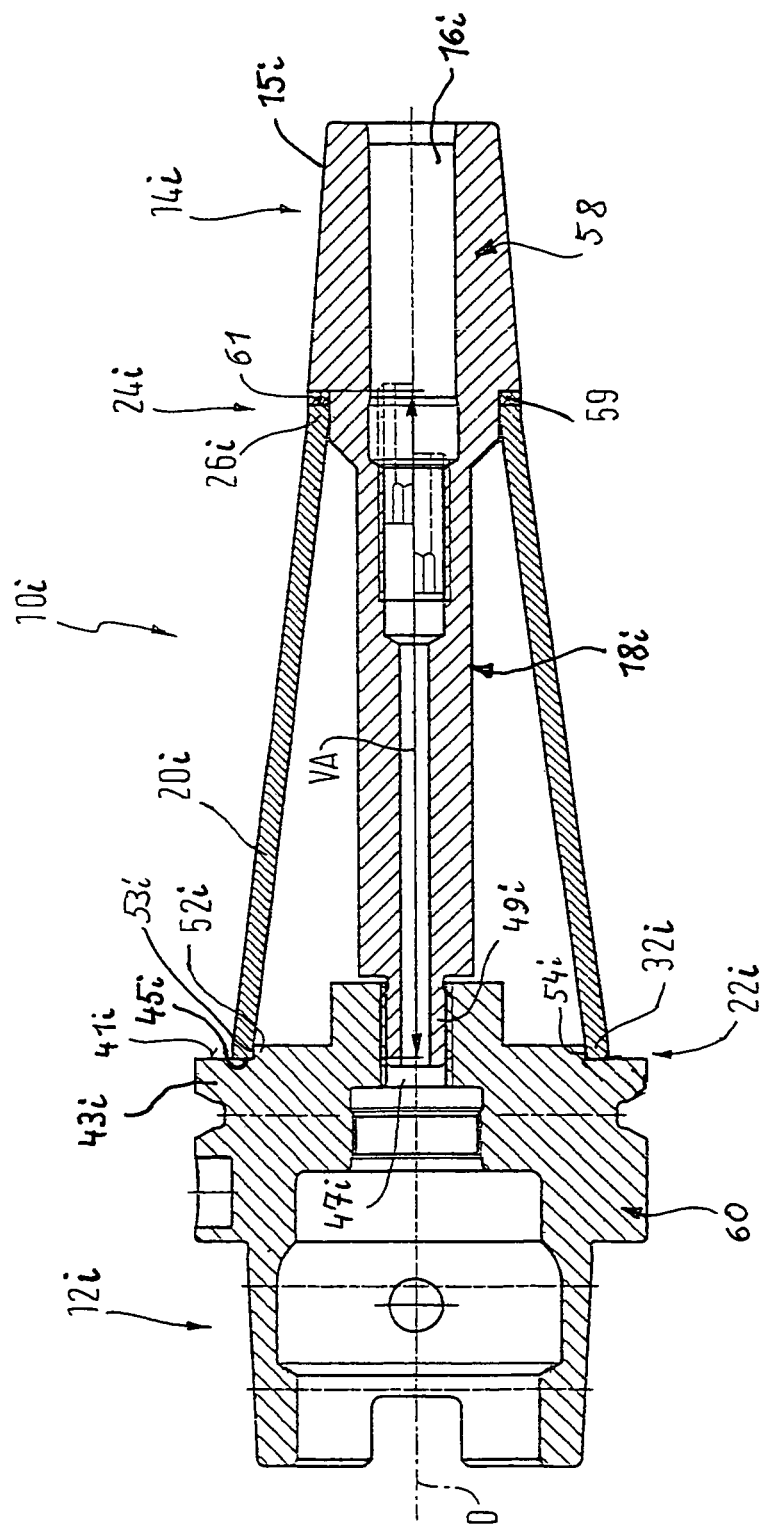

FIG. 10 illustrates a two-part tool holder 10i. The tool holder 10i comprises a coupling-side tool-holder part 58, on which the coupling formation 12i is provided, and a clamping-side tool-holder part 60 on which the clamping formation 14i is provided. The two tool-holder parts 58 and 60 are screw-connected to one another, in which case, in a manner similar to the variant in FIG. 4, an externally threaded pin 49i on the clamping-formation tool-holder part 58 is screwed into a threaded opening 57i on the coupling-formation tool-holder part 60.

The tool-holder parts 58 and 60 here are screwed tight against a conical sleeve 20i, which tapers in the direction of the clamping formation. The sleeve 20i has an end surface 61, which is orthogonal in relation to the axis of rotation D, butting in a joint-forming manner against an abutment surface of the clamping formation 14i, this abutment surface likewise being orthogonal in relation to the axis of rotation D. A corresponding joint is provided on that side of the sleeve 20i which is located in the vicinity of the coupling formation 12i, in the path of bracing forces between the surfaces 41i and 45i. In a radially outward direction, the longitudinal end 32i of the sleeve 20i, this end being in the vicinity of the coupling formation, encloses a collar 52i on the coupling formation 12i and is thus centered in relation to the axis of rotation D. At its longitudinal end 26i, which is in the vicinity of the clamping formation, the sleeve is centered on its inner circumference in relation to the axis of rotation D by the tool-holder part 58, the end side of the longitudinal end 26i of the sleeve 20i, this end being in the vicinity of the clamping formation, butting against a damping ring 59, which is arranged in the axial direction between the longitudinal end 26i of the sleeve 20i and the tool-holder part 58 with the clamping formation 14i. The damping ring 59 may be produced, for example, from ceramic, and its material elasticity differs from that of the tool holder 10i and/or the sleeve 20i. The damping ring 59 damps undesirable movement of the tool holder 10i by internal friction.

In the case of the embodiment which is illustrated in FIG. 10, on account of the screw connection of the tool-holder parts 58 and 60, the sleeve 20i is subjected to compressive stressing in the axial direction, so that the bracing section VA of the tool holder 10i is subjected to mechanical tensile stressing. The magnitude of this tensile stressing can be suitably selected by the application of a certain torque when the tool-holder parts 58 and 60 are screw-connected. An additional possible way of providing precision adjustment for the desired axial bracing is to use a thread with a very small pitch on the pin 49i and on the opening 47i.

FIG. 11, once again, illustrates a two-part tool holder 10k, this time with the tool-holder parts 58k and 60k. In contrast to FIG. 10, the tool-holder parts 58k and 60k are not screw-connected to one another. Rather, the pin 49k of the tool-holder part 48k is merely plugged into the opening 47k of the tool-holder part 60k1.

For production of the tool holder 10k, once the two tool-holder parts 58k and 60k have been plugged together, the tool holder is subjected to compressive force in the axial direction, so that its length is shortened under the action of the compressive force, in accordance with the respective material elasticities. The tool holder 10k here can be shortened until the two end surfaces 45k, 61k of the sleeve 20k butt against the associated mating surfaces on the tool-holder parts 60k, 58k respectively. The sleeve 20k is then connected in a non-releasable manner, by welding, to the respective tool-holder parts 58k and 60k at its two longitudinal ends 26k and 32k. This takes place by virtue of an encircling weld seam 62 being applied at the longitudinal end 32k, which is in the vicinity of the coupling formation, and of an encircling weld seam 63 being applied at the longitudinal end 26k of the sleeve 20k, this longitudinal end being in the vicinity of the clamping formation. Once the weld seam has been applied, the axial compressive loading to which the tool holder has been subjected by a press or by a clamping device during the mounting operation is cancelled, so that the previously shortened tool holder 10k is relieved of stressing counter to the material elasticity of the sleeve 20k. This sleeve 20k is thus subjected to tensile stressing, so that the axial bracing section located between the weld seams 62 and 63 is subjected to compressive stressing.

Figure 12:
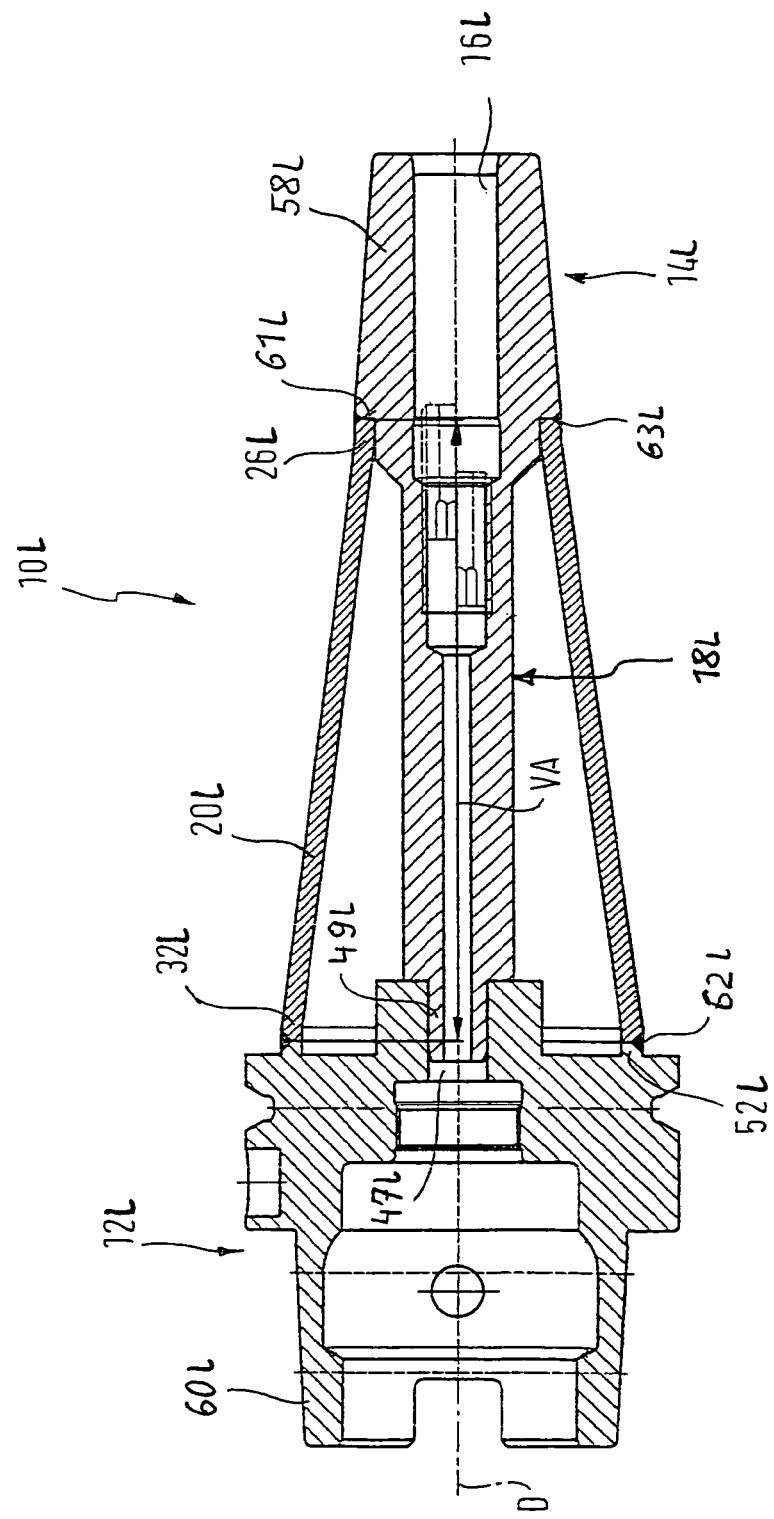

The embodiment of FIG. 12 corresponds essentially to the embodiment of FIG. 10, although the longitudinal end 32l of the sleeve 20l, this longitudinal end being in the vicinity of the coupling formation, is no longer centered on its outer or inner circumference by the collar 52l. Rather, the longitudinal end 32l of the sleeve 20l and an end surface of the collar 52l butt against one another. Centering can take place here during the mounting operation, for example by way of an outer sleeve engaging around the connecting location between the collar 52l and longitudinal end 32i. For better centering of the longitudinal end 32l of the sleeve 20l, this end being in the vicinity of the coupling formation, it is also possible for this longitudinal end to be of stepped design, so that the collar 52l engages in the radially outward direction around an axial protrusion at the longitudinal end 32l of the sleeve 20l, and thus centers the sleeve at its longitudinal end 32l.

Figure 13:
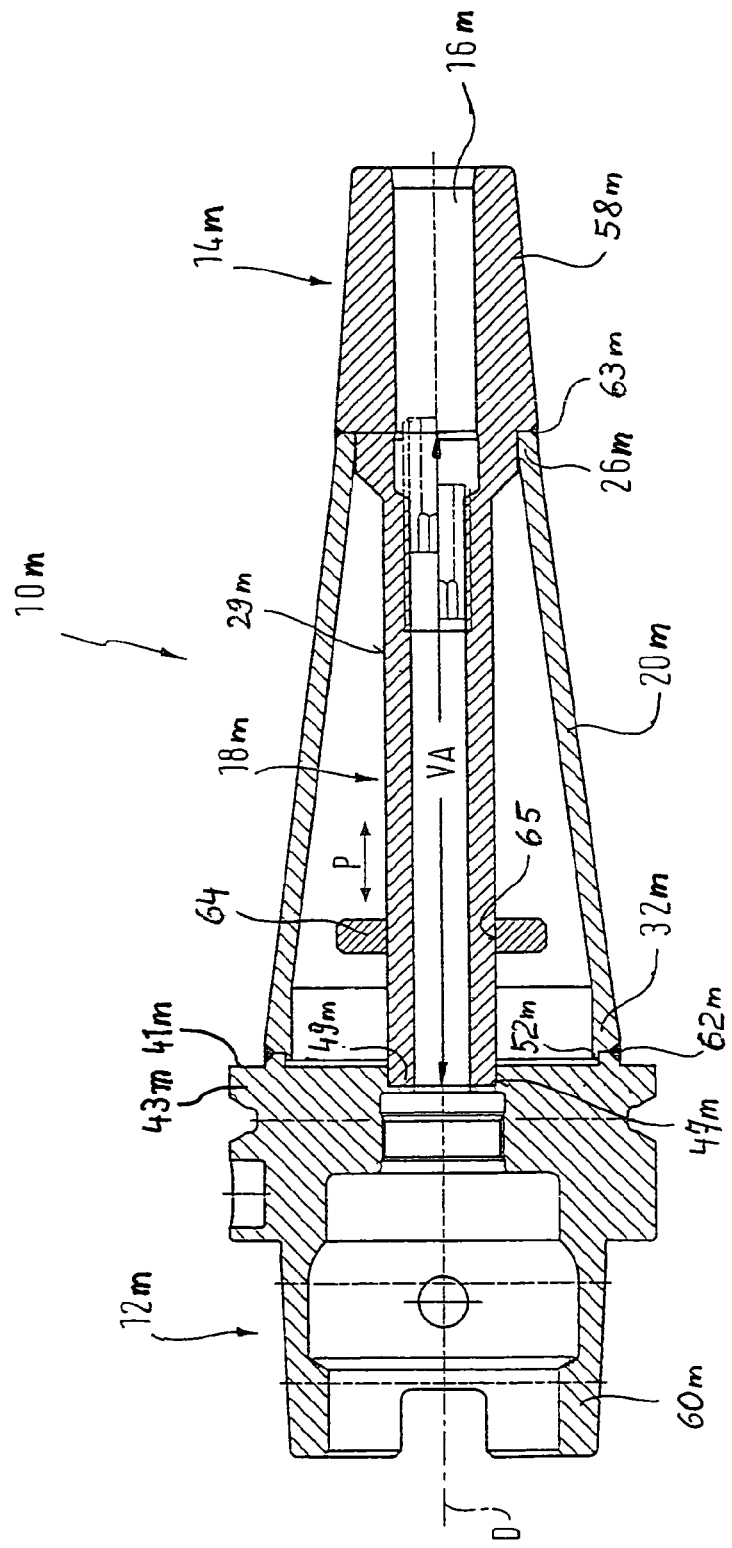

The embodiment illustrated in FIG. 13 corresponds, in terms of the bracing state, to the last-mentioned embodiment of FIG. 12. In addition an oscillating-weight element 64 is provided on the outer lateral surface 29m such that it can be displaced in the axial direction, as is indicated by the double arrow P.

In addition to the axial bracing, the oscillating-weight element 64 counteracts the situation where the tool holder 10m undergoes undesirable vibration. This applies to both torsional vibration and transverse vibration. If the tool holder 10m is caused to vibrate, the narrow shank section 18m is thus also caused to move. Suitably selecting the axial location of attachment of the oscillating-weight element 64 results in the oscillating-weight element and the shank section 18m which bears it being caused to vibrate at the same frequency in offset phases, so that, by virtue of destructive interference, the tool holder system 10m as a whole ends up with overall vibration of relatively low, or even vanishing, amplitude.

The oscillating-weight element 64 may be arranged on the shank section 18m such that it can be displaced, rotated, screw-connected and the like. The oscillating-weight element 64 is formed by a simple ring, the shank section 18m being guided through the inner opening 65 thereof. In order to secure the axial position of the oscillating-weight element 64 on the shank section 18m, the latter is additionally secured in the radial direction, for example by pinning.

Figure 14:
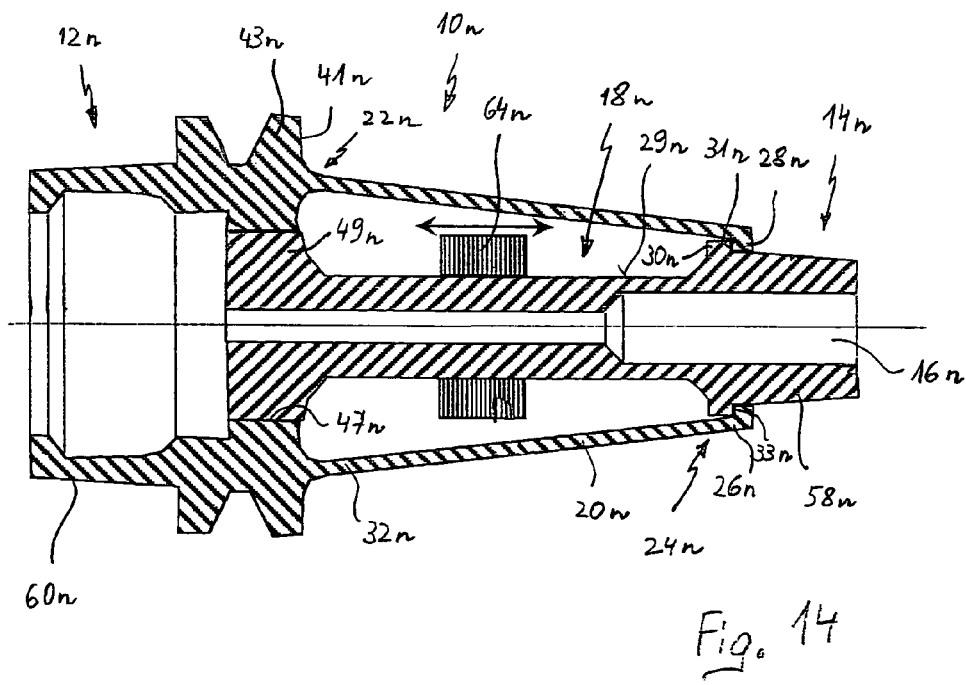
FIGS. 14 and 15 show axially directed longitudinal sections through vibration-damped tool holders with an absorption mass.

FIG. 14 shows a tool holder 10n, which corresponds essentially to the tool holder 10b from FIG. 3, but, once again, bears an axially displaceable oscillating-weight element 64n on its shank section 18n, in a manner similar to the tool holder 10m from FIG. 13. The oscillating-weight element 64n also acts as an absorption mass for reducing the vibration amplitude in the operating region of the tool holder 10n.

Figure 15:
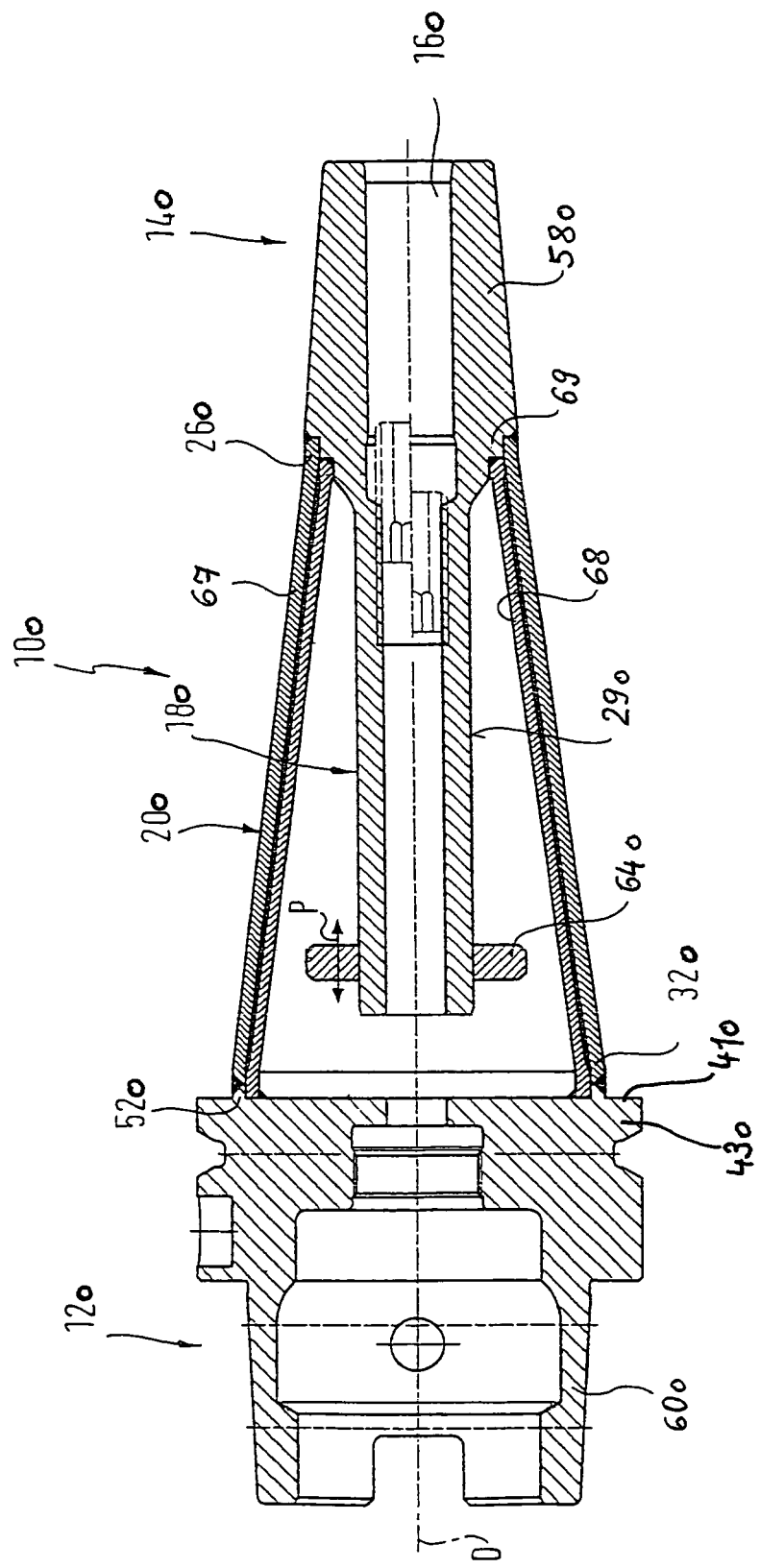

The embodiment of FIG. 15 differs from the embodiment of FIG. 13, on the one hand, in that the tool-holder part 58o with the clamping formation 14o is connected to the tool-holder part 60o with the coupling formation 12o only via the sleeve 20o. The shank section 18o, which is formed integrally on the tool-holder part 58o, does not have its free longitudinal end extending as far as the tool-holder part 60o; rather it terminates in a freely projecting manner in the space surrounded by the sleeve 20o.

The embodiment of FIG. 15 differs from the embodiment of FIG. 13, on the other hand, in that the sleeve 20o is formed by two sleeve shells 67 and 68 which are arranged coaxially over a large common axial section.

The freely projecting longitudinal end of the shank section 18o means that the latter can undergo different forms of vibration to those undergone by the shank 18o in the embodiment of FIG. 13, this shank being clamped in on both sides.

The axial bracing in the case of the embodiment of FIG. 15 is achieved by the two sleeve shells 67 and 68 being braced relative to one another. Each sleeve shell 67 and 68 is welded separately, at each of its longitudinal ends, to the tool-holder parts 58o and 60o assigned to these longitudinal ends. Centering is achieved, for example, in that the encircling collar 52o on the tool-holder part 60o encases the radially inner sleeve shell 68 on its outer circumference, so that the sleeve shell 68 is centered in relation to the tool-holder part 60o. The radially inner sleeve shell 68, in turn, encases a step section 69 of the tool-holder part 58o in the radially outward direction so that this tool-holder part is centered by the inner sleeve shell 68. The way in which the sleeve shell 68 is connected to the individual tool-holder parts 58o and 60o corresponds essentially to the way in which the sleeve 20k is connected in the embodiment of FIG. 11, reference being expressly made at this point to the description of the latter.

Figure 11:
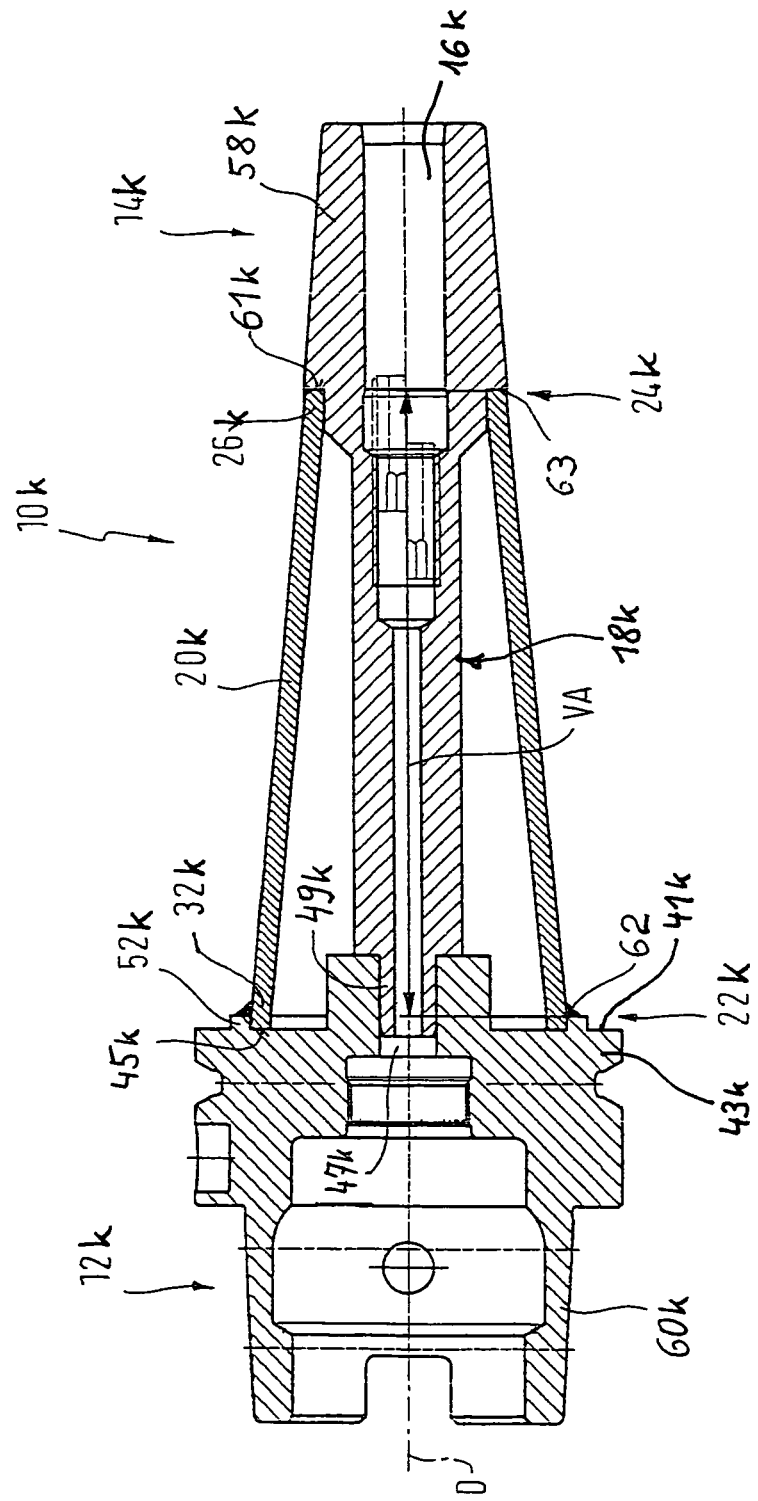

Once the inner sleeve shell 68 has been fitted, the tool holder 10o, as has been described in conjunction with the embodiment of FIG. 11, is subjected to compressive force in the axial direction, so that the axial length of the tool holder 10o is shortened. In this state, in which the tool holder is shortened under the action of external force, the longitudinal ends of the outer sleeve shell 67 are connected in a non-releasable manner, by welding, to the respective tool-holder parts 58o and 60o. The externally applied axial compressive force is then released, so that the inner sleeve shell is subjected to axial compressive stressing, while the outer sleeve shell is subjected to axial tensile stressing.

Figure 16:
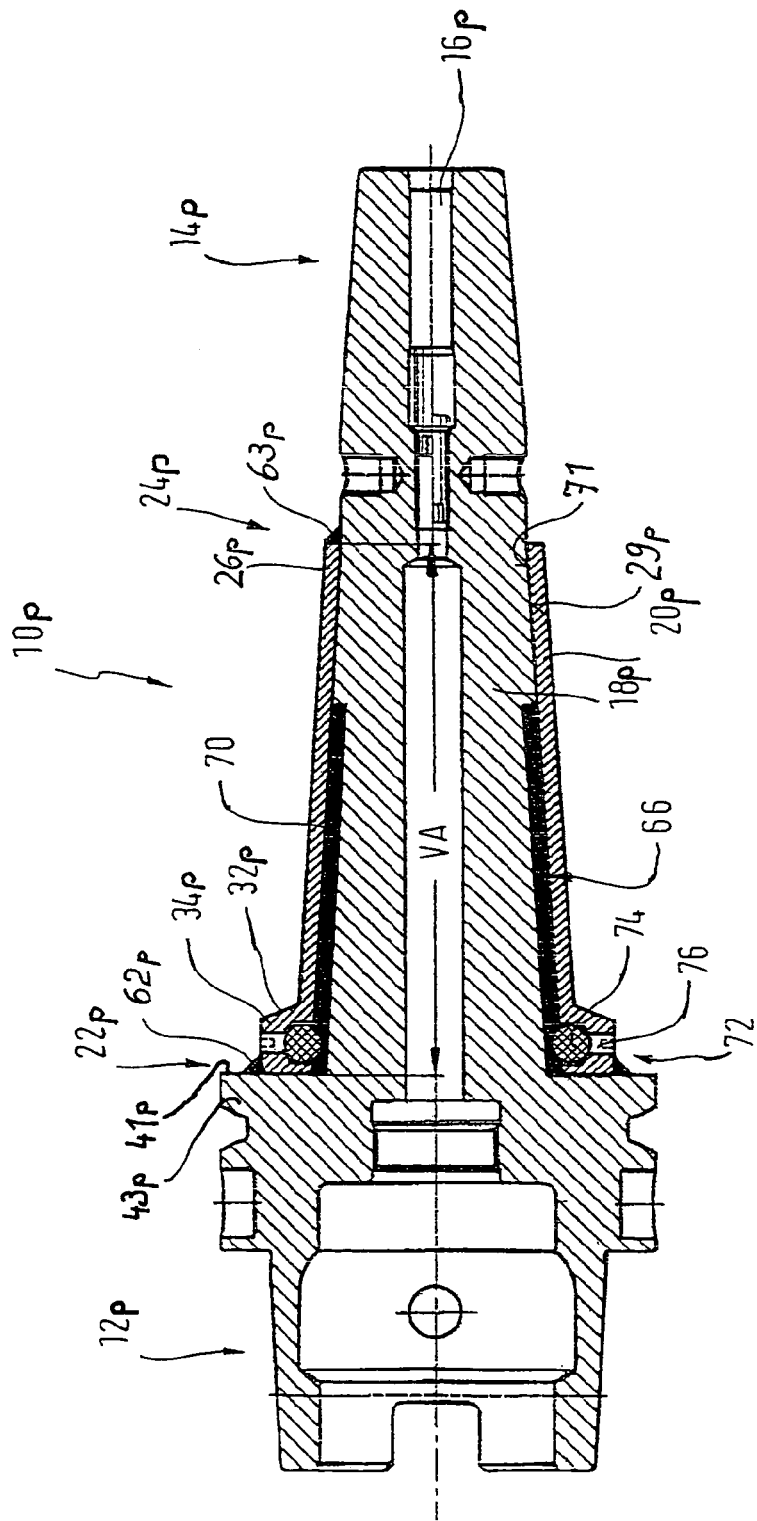
FIG. 16 shows an axially directed longitudinal section through a tool holder with adjustable damping.

In the same way as in FIGS. 1, 2 and 5 to 7, FIG. 16 illustrates a single-piece tool holder 10p. A conical sleeve 20p, which encases the tool holder 10p in the radially outward direction, is welded to the tool holder 10p at the longitudinal end 32p at the radially outer end of its radial flange 34p. The sleeve 20p may likewise be welded to the tool holder 10p at its longitudinal end 26p, which is directed toward the clamping formation 14p, this being shown in the top half of the tool holder 10p, which is illustrated in FIG. 16.

That axial section of the tool holder 10p which is encased by the sleeve 20p is provided, over a predetermined axial section, with a circumferential recess, so that the tool holder 10p together with the sleeve 20p defines a volume 66 into which, in the present example of FIG. 16, oil 70 is introduced such that the entire volume 66 is filled with the oil 70.

Upon rotation of the tool holder 10p, on account of centrifugal force, the oil 70 subjects the inner wall of the sleeve 20p to a radially outwardly directed force. By virtue of the conicity of the sleeve 20p and the fact that the latter is clamped firmly at the longitudinal ends 26p and 32p, this radially outwardly acting force causes the sleeve to be subjected to an axially acting force, so that a bracing section of the tool holder 10p is subjected to mechanical compressive stressing.

Instead of a weld connection, it is possible for the conical sleeve, in the region of its longitudinal end 26p which is in the vicinity of the clamping formation, just to have its conical inner surface 71 in surface abutment against a corresponding conical outer surface 29p of the shank section 18p, as is illustrated in the bottom half of the tool holder 10p in FIG. 16. The force to which the sleeve 20p is subjected in the radial direction upon rotation of the tool holder produces a force component which runs in the direction of the sleeve wall, is oriented in the direction of the coupling formation 12p and by means of which the region of the longitudinal end 26p is displaced slightly in the direction of the coupling formation 12p. This causes the conical inner surface 71 of the sleeve 20p and the conical outer surface 29p of the shank section 18p to butt with sealing action against one another.

Additionally provided on the radial flange 34p is a pressure-exerting device 72, comprising an encircling rubber ring 74, which has its radially inner side in wetting contact with the oil 70, and adjusting screws 76, which are distributed at equal spacings around the circumference of the radial flange 34p. The adjusting screws 76 can be used to adjust the rubber ring 74 in the radially inward direction into the volume 66. The pressure in the oil 70 is thus increased, which results in additional axial bracing of the tool holder 10p via the force to which the sleeve 20p is subjected by the oil 70. Instead of an encircling rubber ring, it is also possible to provide pistons made of ceramic, metal, etc. which are assigned to the adjusting screws in each case and displace the oil 70 directly.

Figure 17:
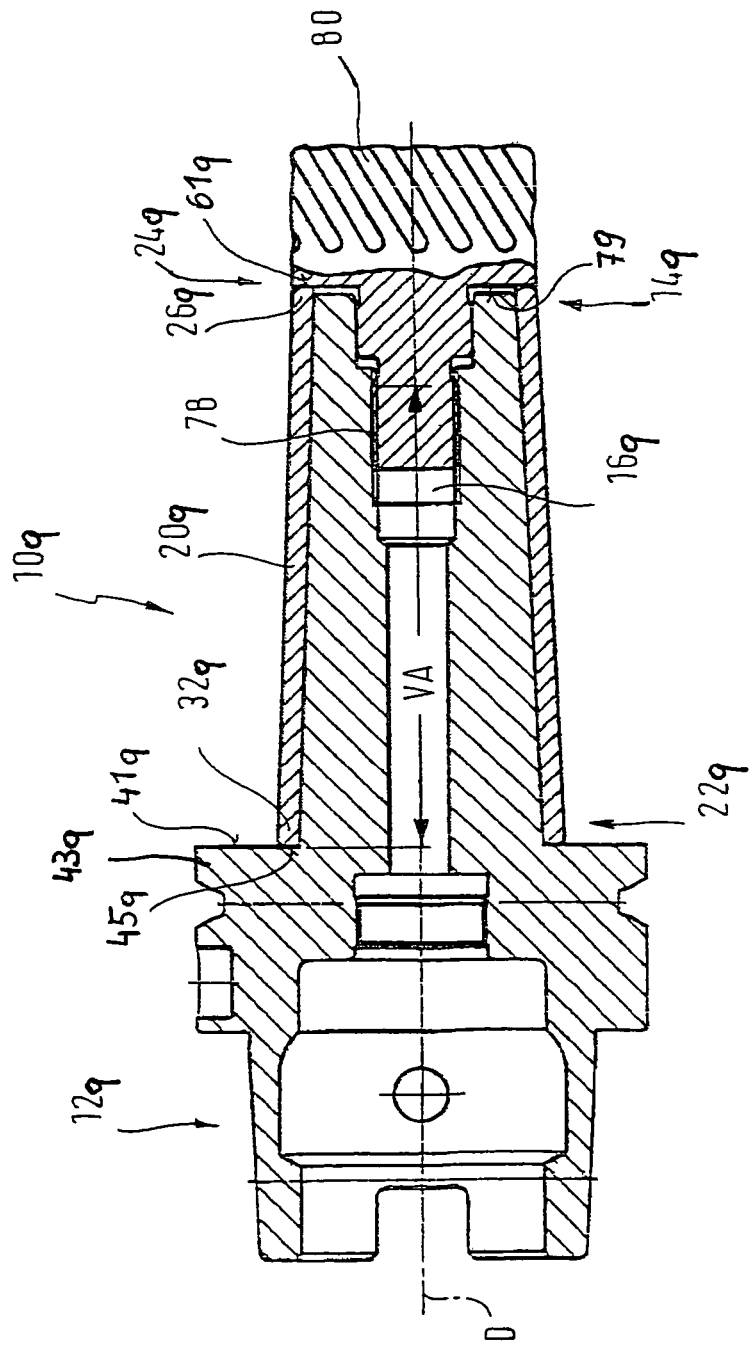
FIGS. 17 and 18 show axially directed longitudinal sections through variants of a tool holder with a sleeve which is prestressed under compressive loading.

In the case of the embodiment which is shown in FIG. 17, the sleeve 20q, which encases the tool holder 10q in the radially outward direction, extends axially beyond the clamping formation 14q.

At its longitudinal end 32q, which is in the vicinity of the coupling formation 12q, the sleeve 20q has its end surface 45q, which is essentially orthogonal in relation to the axis of rotation D, butting against an abutment surface 41q, which is likewise essentially orthogonal in relation to the axis of rotation.

The clamping formation 14q has an internal thread formed on the inner wall which bounds the clamping space 16q. A clamping thread 78 of a milling head 80 is screwed into this internal thread of the clamping formation. The longitudinal end 26q of the sleeve 20q, this end being assigned to the clamping formation 14q, has its end surface 61q, which is essentially orthogonal in relation to the axis of rotation D, butting against a rear surface 79 of the milling head 80, this rear surface likewise being essentially orthogonal in relation to the axis of rotation D. Screwing the milling head 80 into the clamping space 16q against the outer sleeve 20q, subjects the outer sleeve 20q to compressive stressing, while the bracing section VA of the tool holder 10q, this bracing section being encased by the outer sleeve, is subjected to tensile stressing. Instead of a milling head 80, it is possible for any other desired tool with a clamping thread to be screwed into the clamping space 16q.

Figure 18:
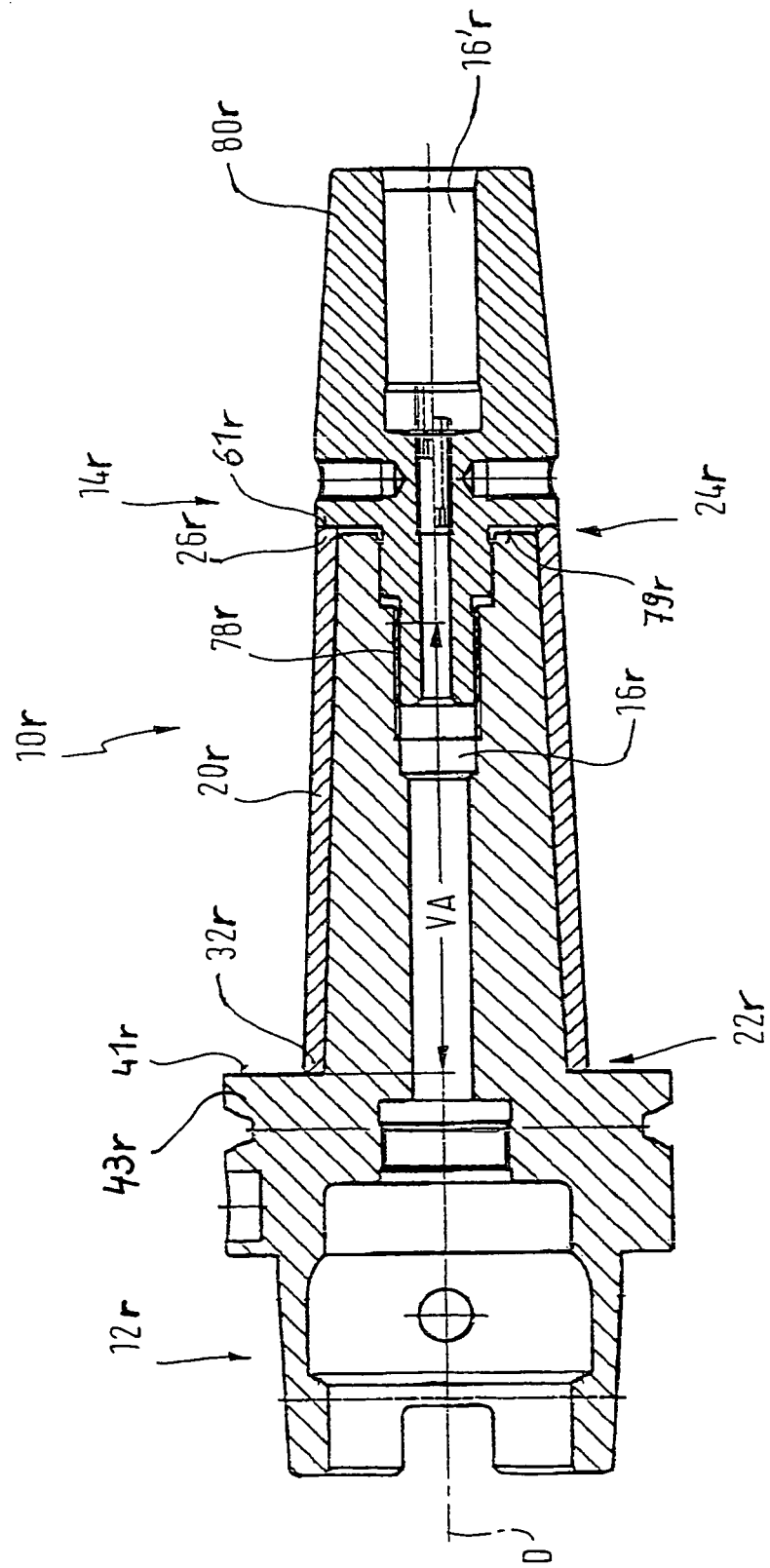

FIG. 18 shows an embodiment which corresponds essentially to the embodiment of FIG. 17. Instead of the milling head 80 here, a shrink-fit attachment 80r is screwed into the clamping space 16r against the sleeve 20r. The shrink-fit attachment 80r in turn, has a clamping space 16'r, into which tool shanks can be clamped as has been described in conjunction with the clamping formation 14 of the embodiment from FIG. 1.

Figure 19:
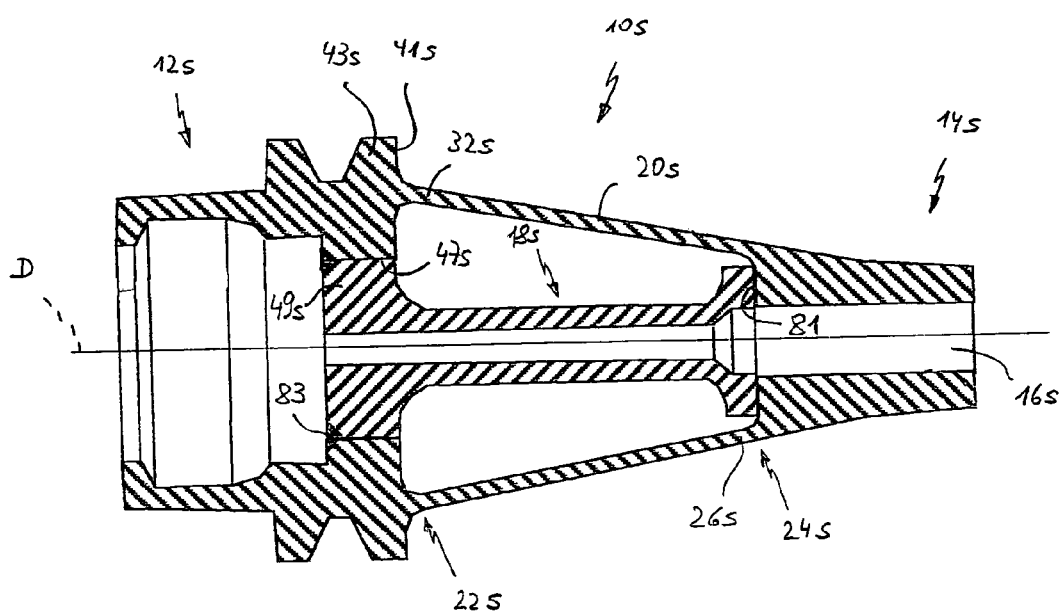
FIGS. 19 and 20 show axially directed longitudinal sections through variants of tool holders with a sleeve which is subjected to tensile loading.

In the case of the tool holders of FIGS. 1, 2 and 5 to 8, the shank section is connected integrally to the clamping formation and coupling formation. FIG. 19 shows a tool holder 10s, in the case of which the sleeve 20s is formed integrally with the coupling formation 12s and the clamping formation 14s. The sleeve 20s is conical and merges, at its larger-diameter end 32s, into the end surface 41s of the radially projecting flange 43s of the coupling formation 12s. At its end which is directed toward the end 26s of the sleeve 20s, the clamping formation 14s has an orthogonal supporting surface 81, which forms the supporting location 24s and butts against that end of the shank section 18s which is adjacent to the clamping formation 14s. The end 49s of the shank section 18s, this end being adjacent to the coupling formation 12s, is radially guided, and fixed, in the opening 47s. Fixing can take place by press-fit action, in a manner similar to the tool holder of FIG. 3, by screw-connection, in a manner similar to the tool holder of FIG. 4, or by an annular weld seam 83. The shank section 18s is fixed such that it is subjected to compressive loading, so that the sleeve 20s is subjected to tensile prestressing.

Figure 20:
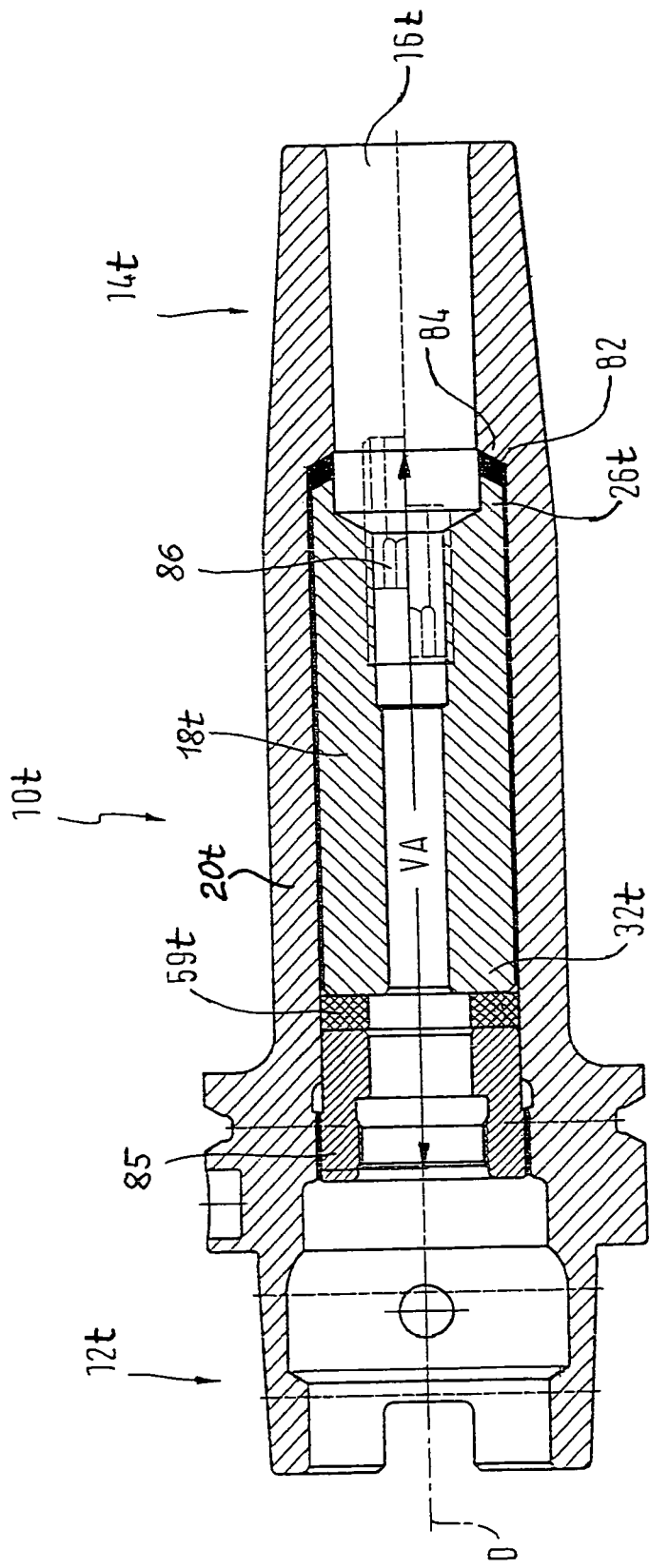

FIG. 20 shows a variant of the tool holder from FIG. 19. Here too, the sleeve 20t is connected integrally to the coupling formation 12t and the clamping formation 14t and encloses a separate shank section 18t, via which the sleeve 20t can be subjected to the tensile bracing. At its longitudinal end 26t, which is in the vicinity of the clamping formation 14t, the, in this case, sleeve-like shank section 18t butts, with the interposition of a compensation element 82, against a protrusion 84 of the clamping formation 14t.

A clamping element 85 is screwed into the tool holder 10t from the side of the coupling formation 12t. An external thread on the clamping element 85 is in screw-action engagement with an internal thread in the coupling section 12t of the tool holder 10t. A damping element 59t, which has been described above with reference to FIG. 10 is arranged axially between the clamping element 85 and the longitudinal end 32t of the shank section 18t, this end being directed toward the coupling formation 12t. A compensation element 82 serves, inter alia, for preventing thermal variation starting from the shrink-fit clamping formation 14t, but this may be dispensed with.

The shank section 18t is of hollow design, in order for cooling fluid to be directed through it, and at its longitudinal end 26t, it has an axially adjustable stop unit 86 forming an axial end stop for a tool shank which can be inserted into the clamping space 16t. Such stop units may also be provided for the other embodiments described.

Figure 21:
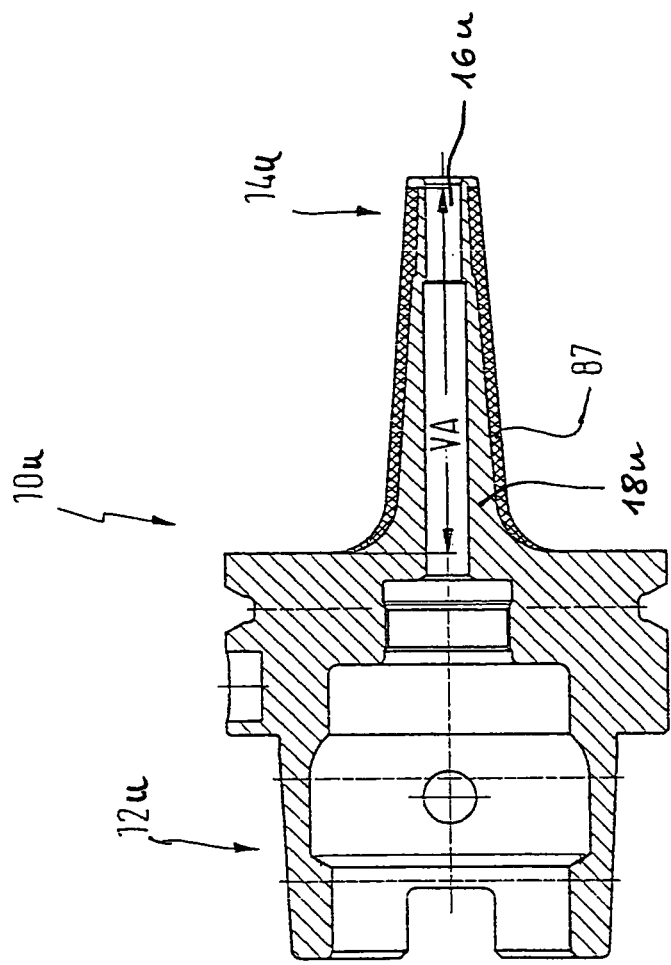
FIG. 21 shows an axially directed longitudinal section through a tool holder with electrically controllable damping.

FIG. 21 illustrates a tool holder 10u, on to which a material 87, which differs from the material of the tool holder 10u, can be fitted, preferably shrink-fitted in a sleeve-like manner from the coupling formation 12u to that longitudinal end region of the tool holder which is in the vicinity of the clamping formation. This also results in axial bracing of an axial section 18u of the tool holder 10u. The material may be metal, ceramic or an electrostrictive material which changes its longitudinal dimensions in at least one direction of space by virtue of an electric voltage being applied. It is thus possible, by applying an electric voltage to the material, to change the force to which the tool holder 10u is subjected by this material.

Figure 22:
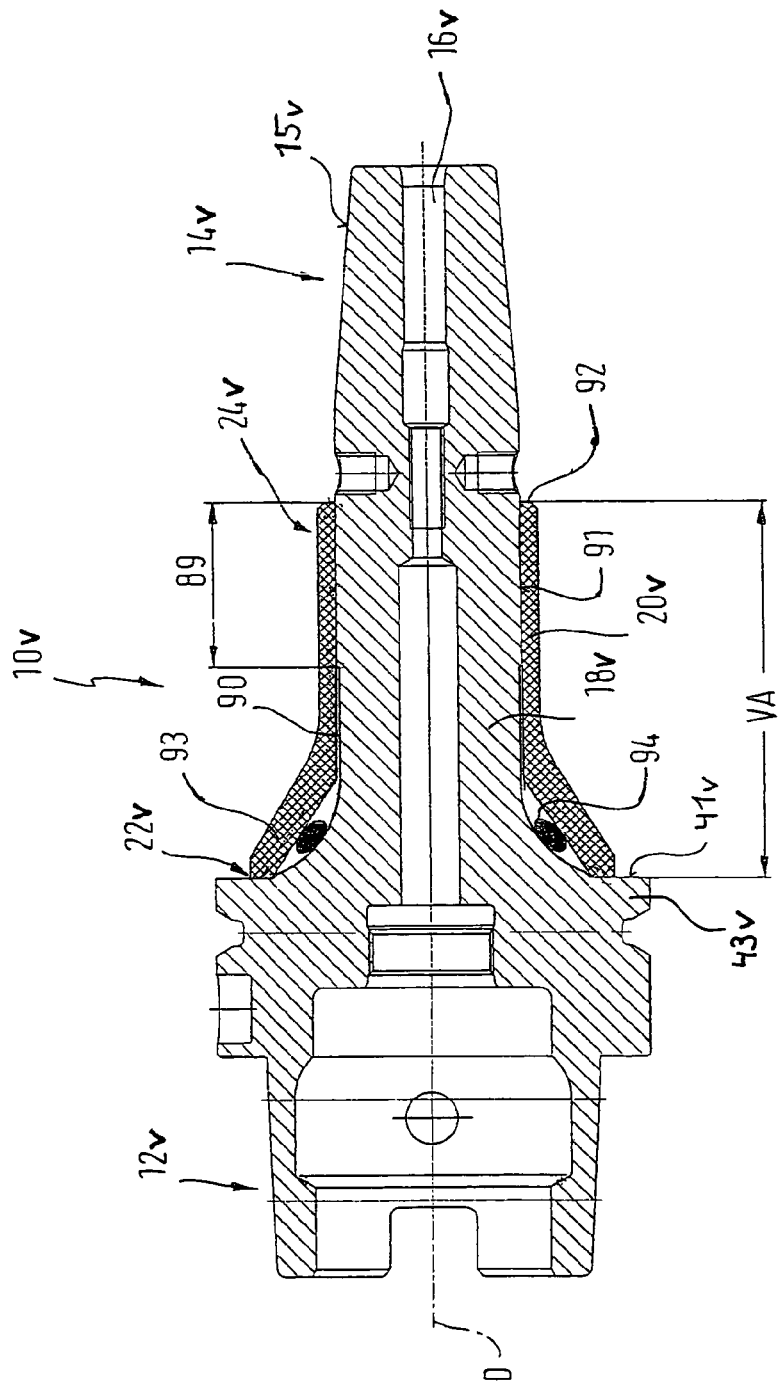
FIGS. 22 to 26 show axially directed longitudinal sections through tool holders with friction-fit damping.

FIG. 22 shows a tool holder 10v of the shrink-fit holder type with a clamping shank 18v which, at one end, projects axially from an axis-normal shoulder 88v which is formed by the coupling formation 12v, and, on the side of its clamping formation 14v, which is directed axially away from the coupling formation 12v, contains a central clamping recess 16v for clamping the shank of the tool (not illustrated specifically) with a shrink fit, as has been explained in more detail with reference to FIG. 1. Between the coupling formation 12v and the clamping formation 14v, the clamping shank 18v is enclosed by a sleeve 20v, which forms the bracing arrangement and has its end which is adjacent to the coupling formation 12v supported axially on an annular end surface 88 in a supporting location 22v. By way of its other supporting end 24v, which is axially adjacent to the clamping formation 14v, the sleeve 20v is seated with press-fit action on the circumference of the shank section 18v, in a friction-fit region 89. In the axial direction between the friction-fit region 89 and the supporting location 22v, the sleeve 20v is spaced apart radially from the shank section 18v to form an annular gap 90. The circumferential surfaces which are located with press-fit action one upon the other in the friction-fit section 89, that is to say the lateral surface of the sleeve 20v, on the one hand and the shank section 18v, on the other hand, are in the form of a steep cone 91 which, over the predetermined axial length, tapers axially with a slope of approximately 0.1 in the direction of the clamping formation 14v, to be precise such that the cone of the shank section 18v is oversized in relation to the end position of the attached sleeve 20v, in order to produce the press-fit action. It goes without saying, however, that the surfaces which are positioned against one another in the friction-fit section 89 may also be designed as cylindrical surfaces. In order to produce the prestressing force, the sleeve end 92, which is directed toward the clamping formation 14v, is pushed against the annular surface 41v by a force measuring a number of tons, for example, 10 tons, which results in resilient bracing of the sleeve 20v. The press-fit action in the region 89 produces, overall, a retaining force by means of which the sleeve 20v prestressed in this way is retained in its prestressed position. At the same time, however, in those regions of the friction-fit section 89 which are directed axially toward the coupling formation 12*v*, it is possible for the sleeve 20*v* and the clamping shank 18*v* to move relative to one another counter to the friction-fit force, as a result of which the torsional and bending vibration of the shank section 18*b* is damped.

Figure 23:
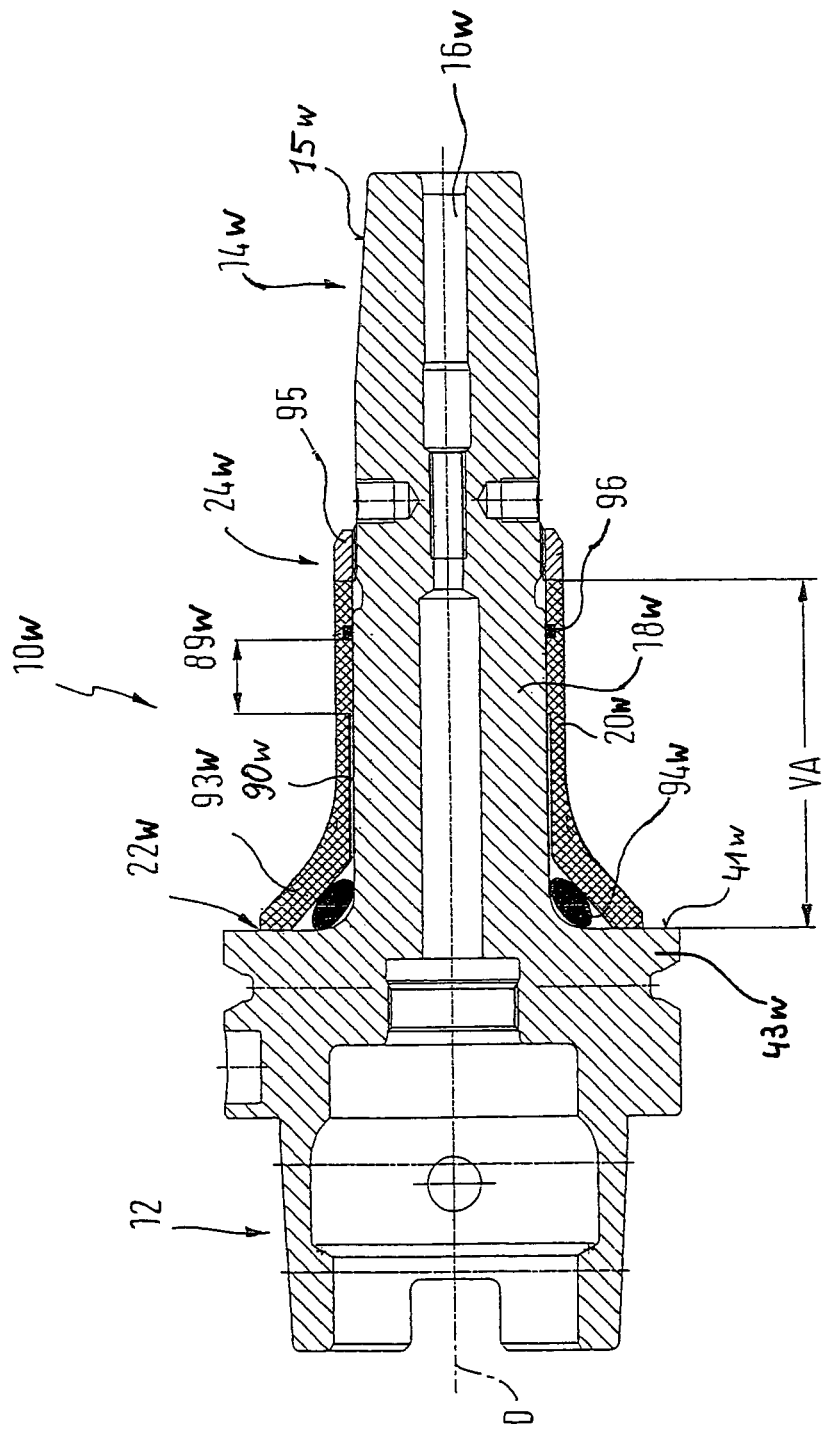

FIG. 23 shows a variant of a tool holder 10*w* of the shrink-fit type, this variant differing from the variant of FIG. 22 merely in that the friction-fit section 89*w*, in which the shank section 18*w* is oversized radially in relation to the internal diameter of the sleeve 20*w*, is dimensioned primarily for the frictional damping of the tool holder 10*w*, while the supporting location 24*w*, at which the sleeve 20*w* is supported with the prestressing force FK, is formed by a nut 95 which is screwed on to an external thread of the clamping shank 18*w*. Here too, the prestressing force by means of which the sleeve 20*w* is clamped in between its supporting locations 22*w* and 24*w* is a number of tons, for example, 10 tons. Moreover, the sleeve 20*w* corresponds, in terms of its form, to the sleeve 20*v* in FIG. 22, although, in addition, in the region of the end which is directed toward the clamping formation 14*w*, a further damping ring 96 is provided between the sleeve 20*w* and the clamping shank 18*w*.

FIG. 23 shows a variant of a tool holder 10*w* of the shrink-fit type, this variant differing from the variant of FIG. 22 merely in that the friction-fit section 89*w*, in which the shank section 18*w* is oversized radially in relation to the internal diameter of the sleeve 20*w*, is dimensioned primarily for the frictional damping of the tool holder 10*w*, while the supporting location 24*w*, at which the sleeve 20*w* is supported with the prestressing force FK, is formed by a nut 95 which is screwed on to an external thread of the clamping shank 18*w*. Here too, the prestressing force by means of which the sleeve 20*w* is clamped in between its supporting locations 22*w* and 24*w* is a number of tons, for example, 10 tons. Moreover, the sleeve 20*w* corresponds, in terms of its form, to the sleeve 20*w* in FIG. 22, although, in addition, in the region of the end which is directed toward the clamping formation 14*w*, a further damping ring 96 is provided between the sleeve 20*w* and the clamping shank 18*w*.

Figure 24:
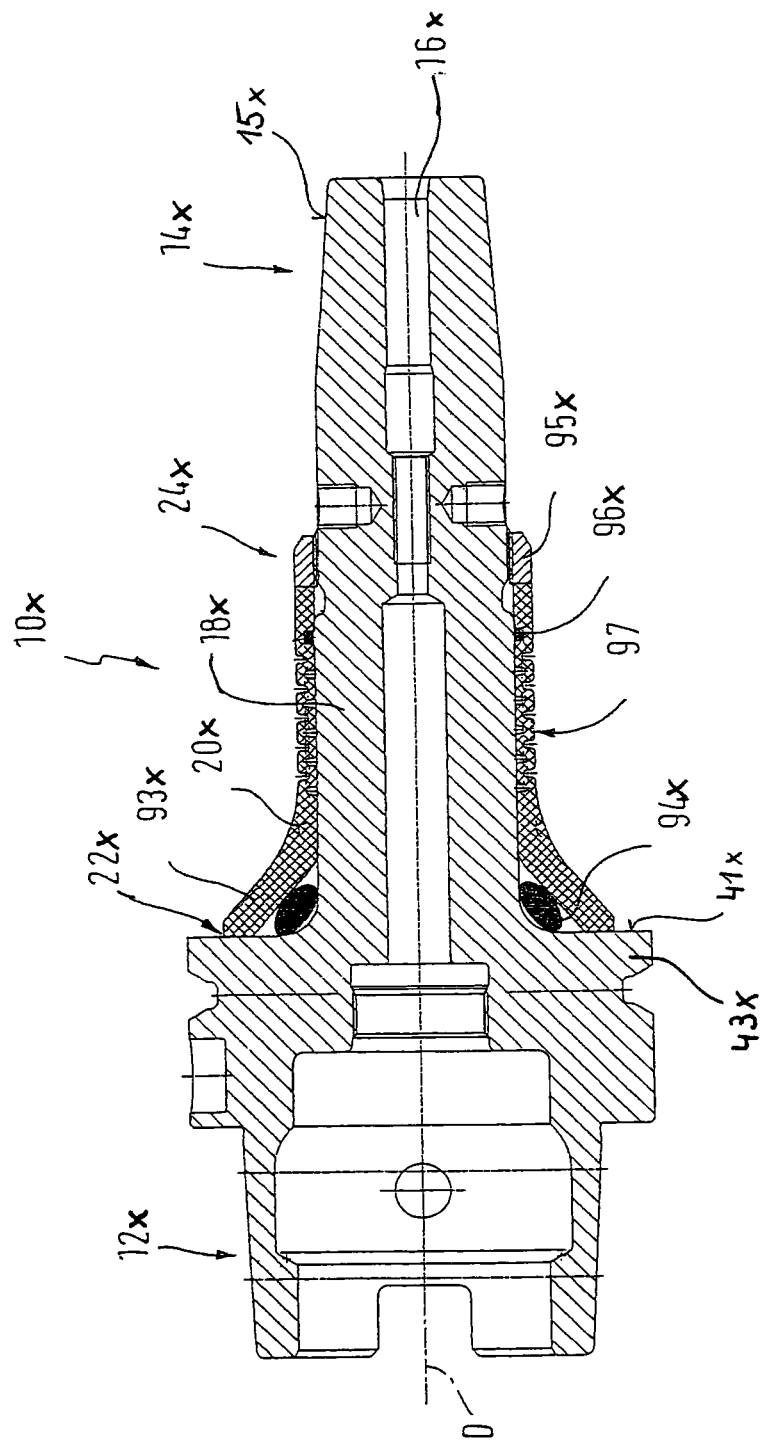

The configuration according to FIG. 24 differs from the variant of FIG. 23 essentially only in that part of the axial length of the sleeve 20*x* is designed as a sleeve-like zigzag spring 97 which, in the case of axial and radial bracing, produces both axial and radial spring forces.

Figure 25:
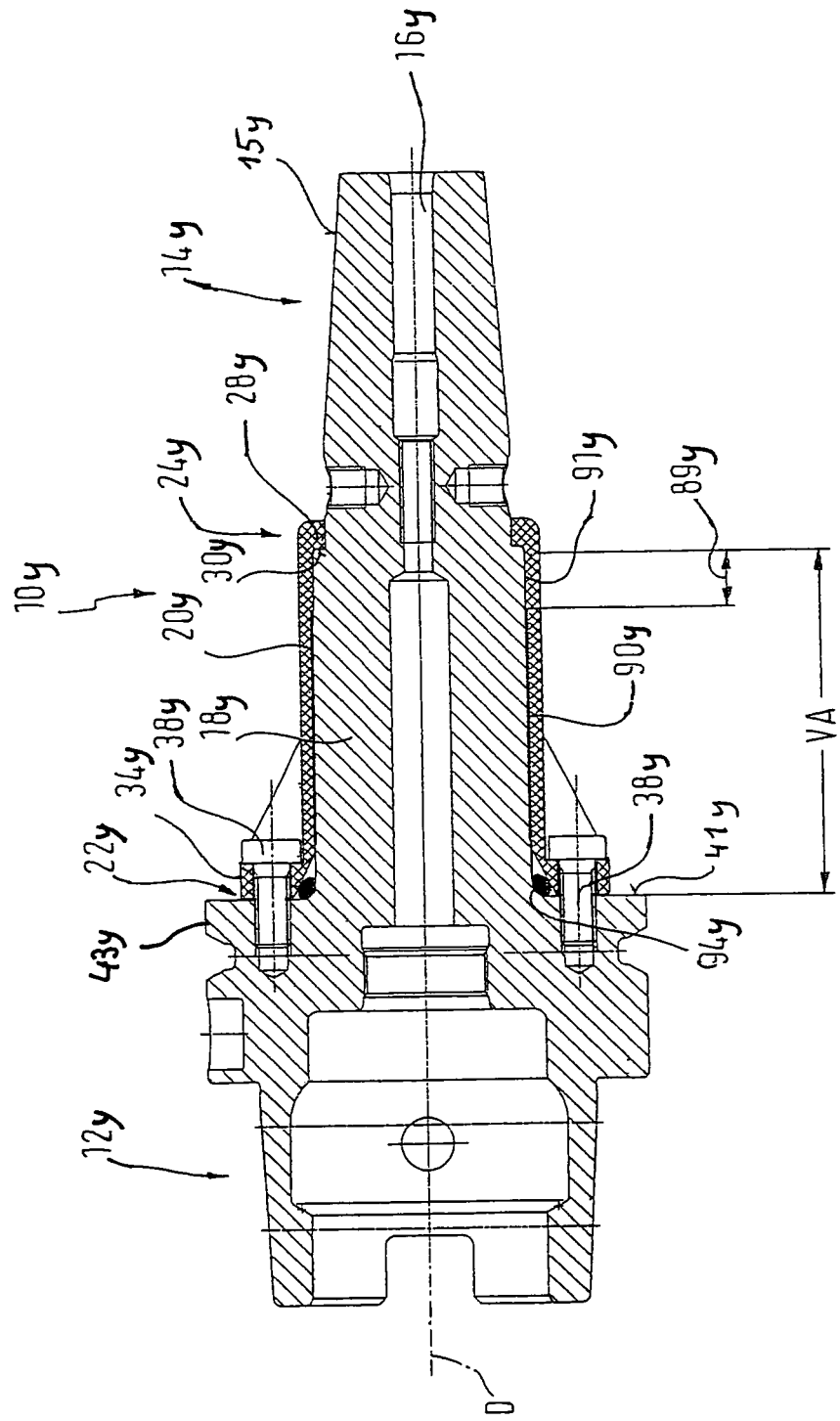

FIG. 25 shows a variant in which the principles of the variant of FIG. 22 are realized for an embodiment similar to the variants of FIG. 1. For axial bracing of the sleeve 20*y*, in order to form the supporting location 24*y*, an inwardly projecting radial protrusion 28*y* is integrally formed at that end of the sleeve adjacent to the coupling formation 14*y*, the radial protrusion being supported on a shoulder 30*y* of the shank section 18*y*. At the other end, which is adjacent to the coupling formation 12*y*, the sleeve 20*y* bears a radially outwardly projecting radial flange 34*y* which, in order to produce the prestressing force VK, is clamped by means of screws 38*y* against the annular shoulder 41*y* of the coupling formation 12*y*. This configuration also has a friction-fit section 89*y*, in which the, if appropriate, conical (section 91*y*) outer circumference of the flange section 18*y* is clamped radially against the, in this region likewise conical, inner lateral surface of the sleeve 20*y* to form a friction fit. In the region of the supporting location 22*y*, the inner lateral surface of the sleeve 20*y* is of conical design and, once again, covers over a damping ring 94*y*. In the axial direction between the flange 34*y* and the friction-fit section 89*y*, the sleeve 20*y* is spaced apart radially from the shank section 18*y* to form an annular gap 90*y*.

Figure 26:
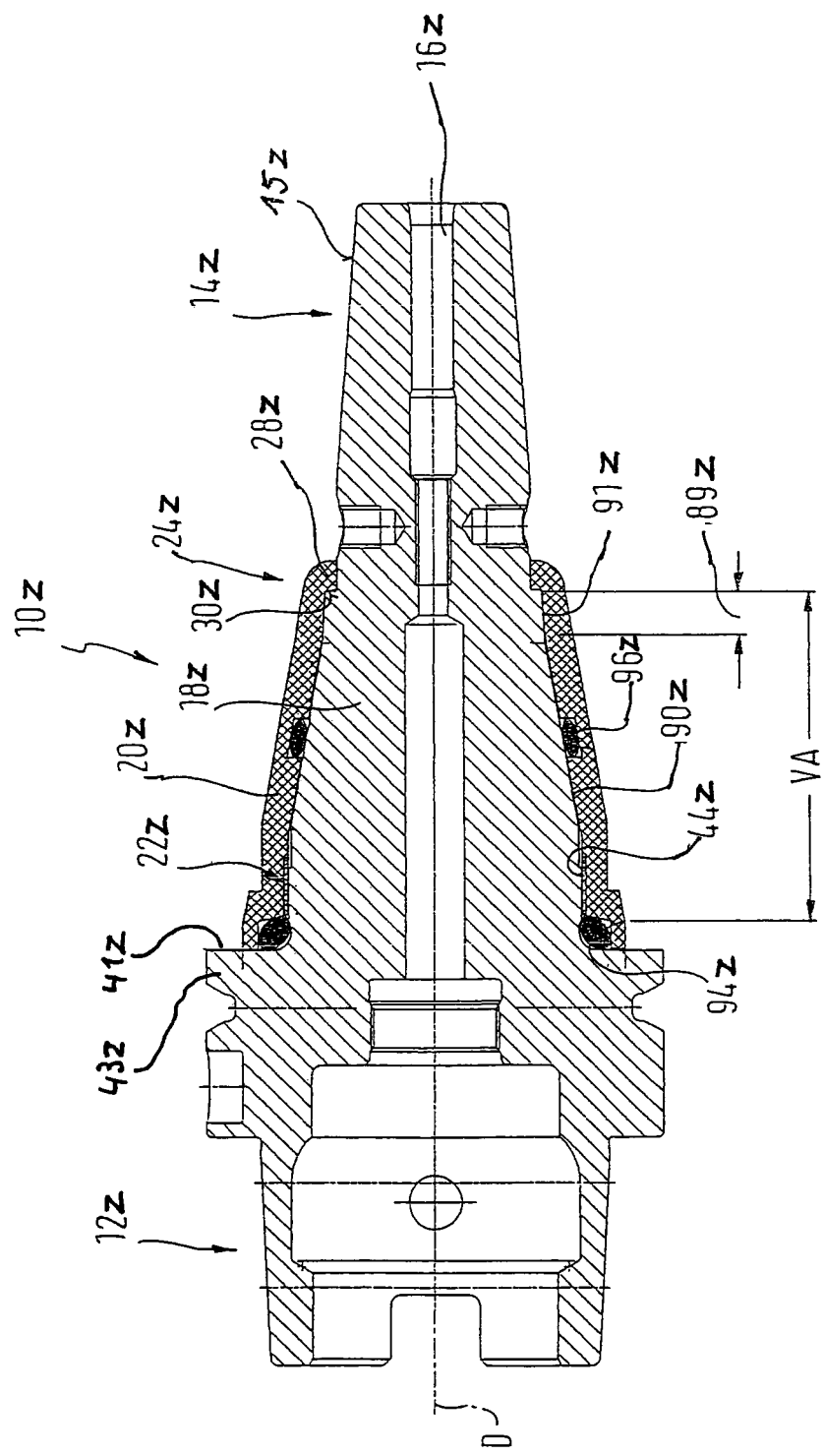

FIG. 26 shows a tool holder 10*z* of the shrink-fit type, this tool holder realizing the principles of the variant of FIG. 23 for a configuration according to FIG. 5. While the supporting location 24*z*, which is adjacent to the clamping formation 14*z*, is formed by a radially inwardly projecting radial protrusion 28*z*, which butts against an annular shoulder 30*z* of the clamping shank 18*z*, the sleeve 20*z*, on the side of the coupling formation 12*z*, in order to form the supporting location 24*z*, has an internal thread screwed on to an external thread 44*z* of the clamping shank 18*z*. Adjacent to the supporting location 24*z*, the sleeve 20*z* encloses the circumference of the shank section 18*z* in a friction-fit section 89*z*. The shank section 18*z* is oversized radially in this region and, in the same way as the inner lateral surface of the sleeve 20*z*, may be of slightly conical design. Moreover, the sleeve 20*z* is spaced apart radially (annular gap 90*z*) from the shank section 18*z*. Damping rings can be seen at 94*z* and 96*z*.

Figure 27:
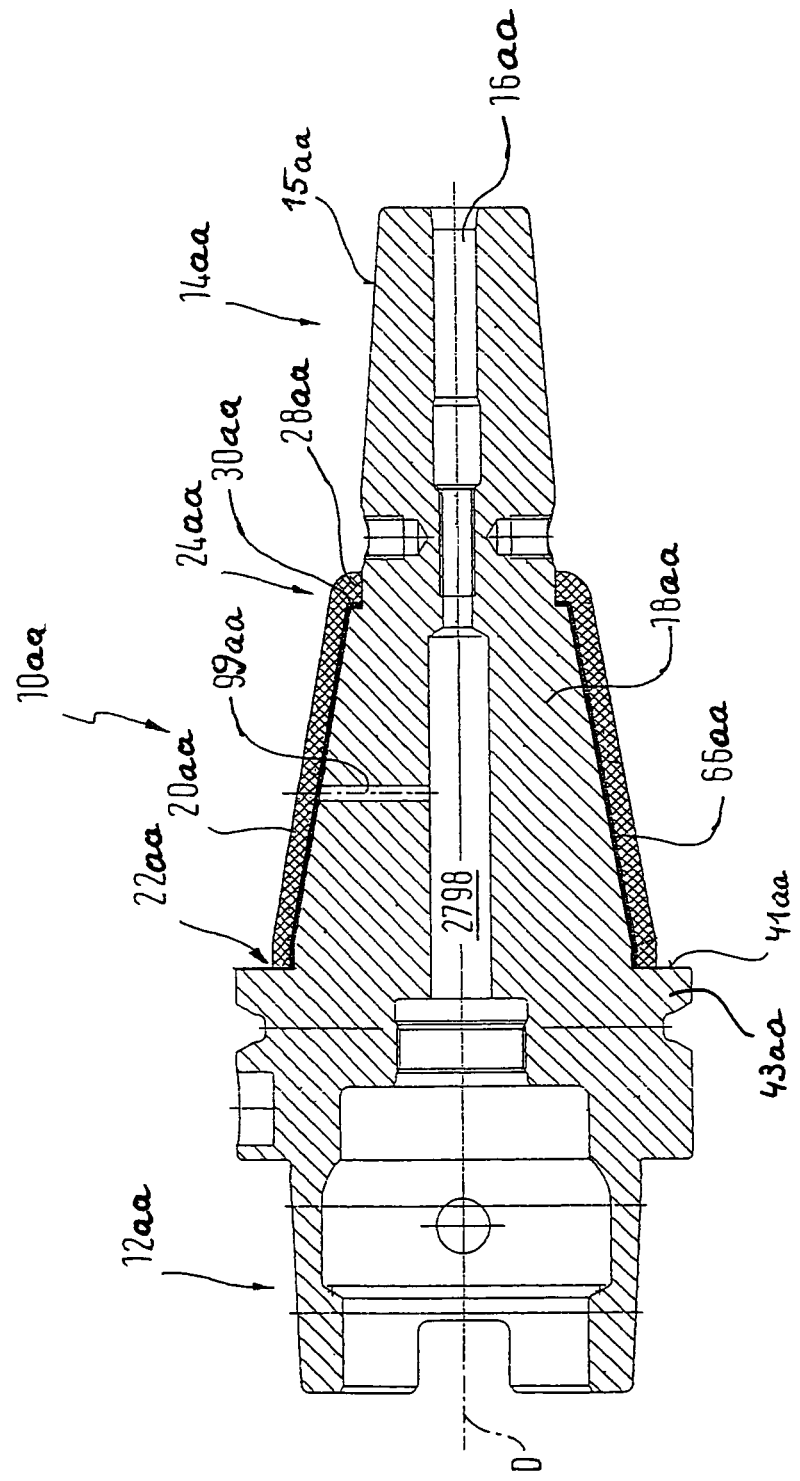
FIGS. 27 and 28 show axially directed longitudinal sections through tool holders with adjustable damping.

FIG. 27 shows a tool holder 10*aa* of the shrink-fit type, similar to the variant of FIG. 16. The, in this case, conical clamping shank 18*aa* has a likewise conical sleeve 20*aa* positioned on it to form an annular chamber 66*aa*, and, on the two supporting locations 22*aa* and 24*aa*, the sleeve is fixed, in this case welded, to the tool holder 10*aa* in a sealed manner over the entire circumference. In the exemplary embodiment illustrated, the sleeve 20*aa* has one end seated on an annular end surface 41*aa* of the coupling formation 12*aa*, this end surface enclosing the foot of the shank section 18*aa*. At its other end, which forms the supporting location 24*aa*, the sleeve is provided with a radially inwardly projecting annular flange 28*aa*, which butts against an annular shoulder 30*aa* of the shank section 18*aa*, this annular shoulder being oriented axially in the same direction as the shoulder 41*aa*. The sleeve 20*aa* can thus be connected to the shank section 18*aa*, in particular by friction welding, at the two supporting locations 22*aa* and 24*aa* in one operation.

The annular chamber 66*aa* between the shank section 18*aa* and the sleeve 20*aa* is accessible from the outside via a feed channel 99, in this case via a central further channel 98 of the tool holder 10*aa*. In order to produce a prestressing force, free-flowing material is pushed into the annular chamber 66*aa* via the channels 98 and 99 during production of the tool holder 10*aa*, this material then solidifying in consistency in the annular chamber 66*aa*. The material may be a rubber compound which is vulcanized fully in the chamber 66*aa*. However, it may also be a curable plastic material, for example a resin or the like, which cures in the annular chamber 66*aa*. Sinterable materials are also suitable. The material introduced into the annular chamber 66*aa* inflates the sleeve 20*aa* and thus produces the axial prestressing force VK. The material introduced has to be capable of solidifying under the increased introduction pressure, so that it can withstand the increased pressure even in the solidified state. It is possible for the material to have elastic properties and/or to butt with a friction fit against the sleeve 20*aa* and/or the shank section 18*aa*. It goes without saying that the material may also, if appropriate, be introduced from the outside through an opening of the sleeve 20*aa*, as is indicated in FIG. 16.

Figure 28:
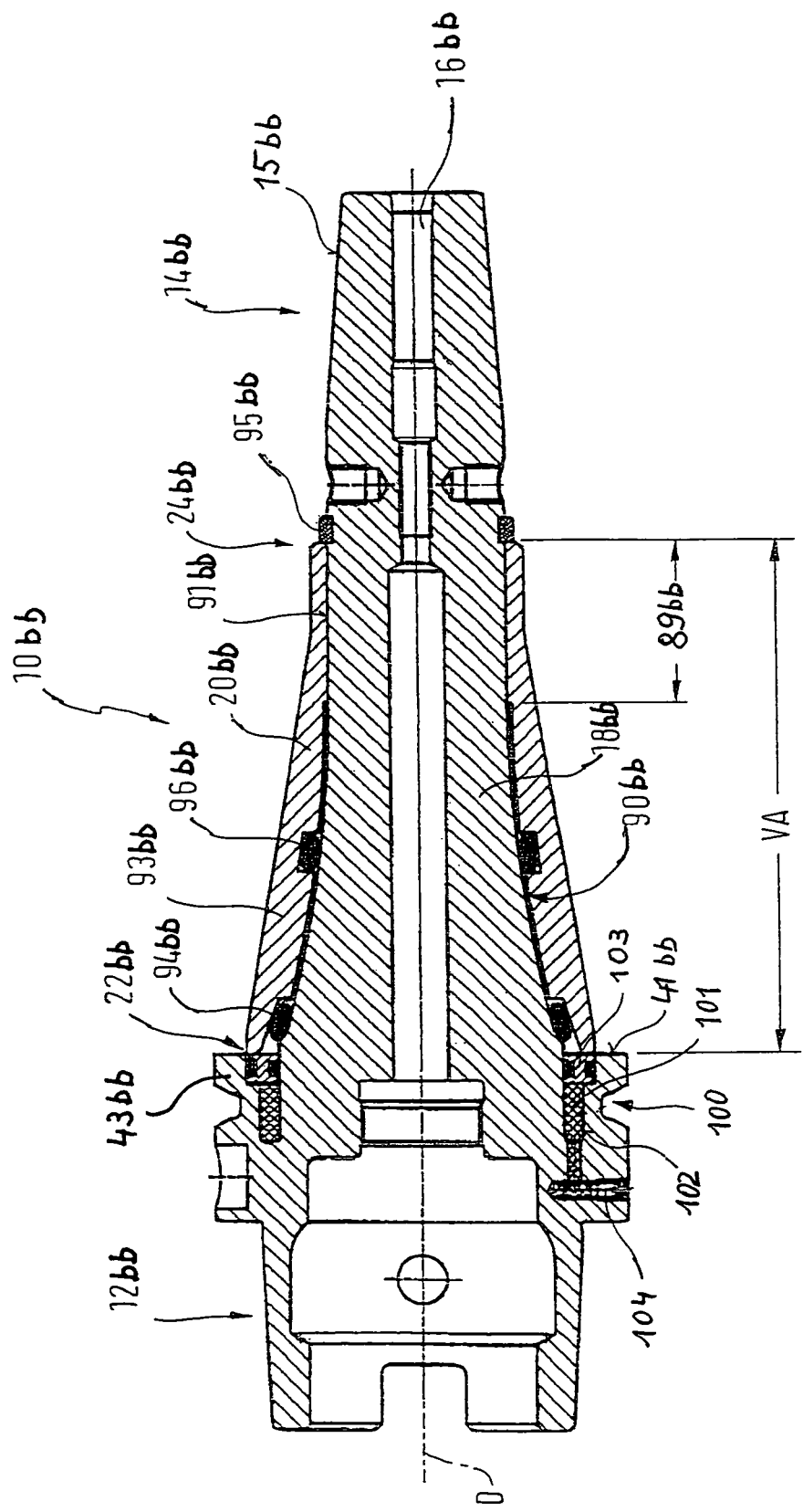

FIG. 28 shows a further variant of a tool holder 10*bb* of the shrink-fit type, in the case of which, in a manner similar to the variant of FIG. 22, that end of the bracing arrangement-forming sleeve 20*bb* which is axially adjacent to the clamping formation 14*bb* butts against the clamping shank 18*bb* in a friction-fit section 89*bb*. The friction-fit section 89*bb* need not apply axial fixing forces for fixing the sleeve 20*bb* with press-fit action. The sleeve has its end which is adjacent to the clamping formation 14*bb* supported on a radially elastic securing ring 95*bb*, which is snap-fitted in a releasable manner into an annular groove of the circumference of the clamping shank 18*bb*. Instead of the securing ring 95*bb*, it is also possible, if appropriate, in a manner similar to the variant of FIG. 23, to provide a nut screwed on to the clamping shank 18*bb*. The circumferential contour of the clamping shank 18*bb* and of the sleeve 20*bb* butting against the same may, once again, be in the form of a self-locking, steep cone 91*bb* in the friction-fit section 89*bb*, as has been explained with reference to FIG. 22. It goes without saying that, here too, as with all the variants which have been explained above, it is also possible to provide a cylindrical friction-fit region instead of the cone. The friction fit, in turn, is achieved by the diameter of the shank section 18*bb* being oversized to a certain extent in relation to the internal diameter of the sleeve 20*bb*.

That end of the sleeve 20*bb* which is axially adjacent to the clamping formation 12*bb* is supported axially on a hydraulic supporting arrangement 100. The supporting arrangement 100 has an annular chamber 102 which is filled with a hydraulic pressure medium 101, is central in relation to the axis of rotation D and in which an annular piston 103 is guided in a sealed manner such that it can be displaced axially. The sleeve 20*bb* is supported on the annular piston 103 in the region of the annular surface 41*bb*, which is formed on the foot of the shank section 18*bb*. A piston screw 104, which communicates with the pressure medium 101 in the annular chamber 102, allows variable compressive loading of the pressure medium 101 and thus, via the annular piston 103, axial bracing of the sleeve 20*bb*.

The pressure medium may be hydraulic oil or the like. Free-flowing and/or elastomeric materials, but also viscoelastic substances, are also suitable. It goes without saying that the annular piston 103 may also be formed integrally on the sleeve 20*bb*.

Embodiments which have not been illustrated specifically are ones which, with a kinematically inverse installation position of the supporting device 100, also allow the sleeve 20*bb* to be subjected to tensile loading. It goes without saying, furthermore, that the supporting device 100 can also be used for the axial bracing of the bracing arrangement in the case of all the other tool holders which have been explained above.

Figure 29:
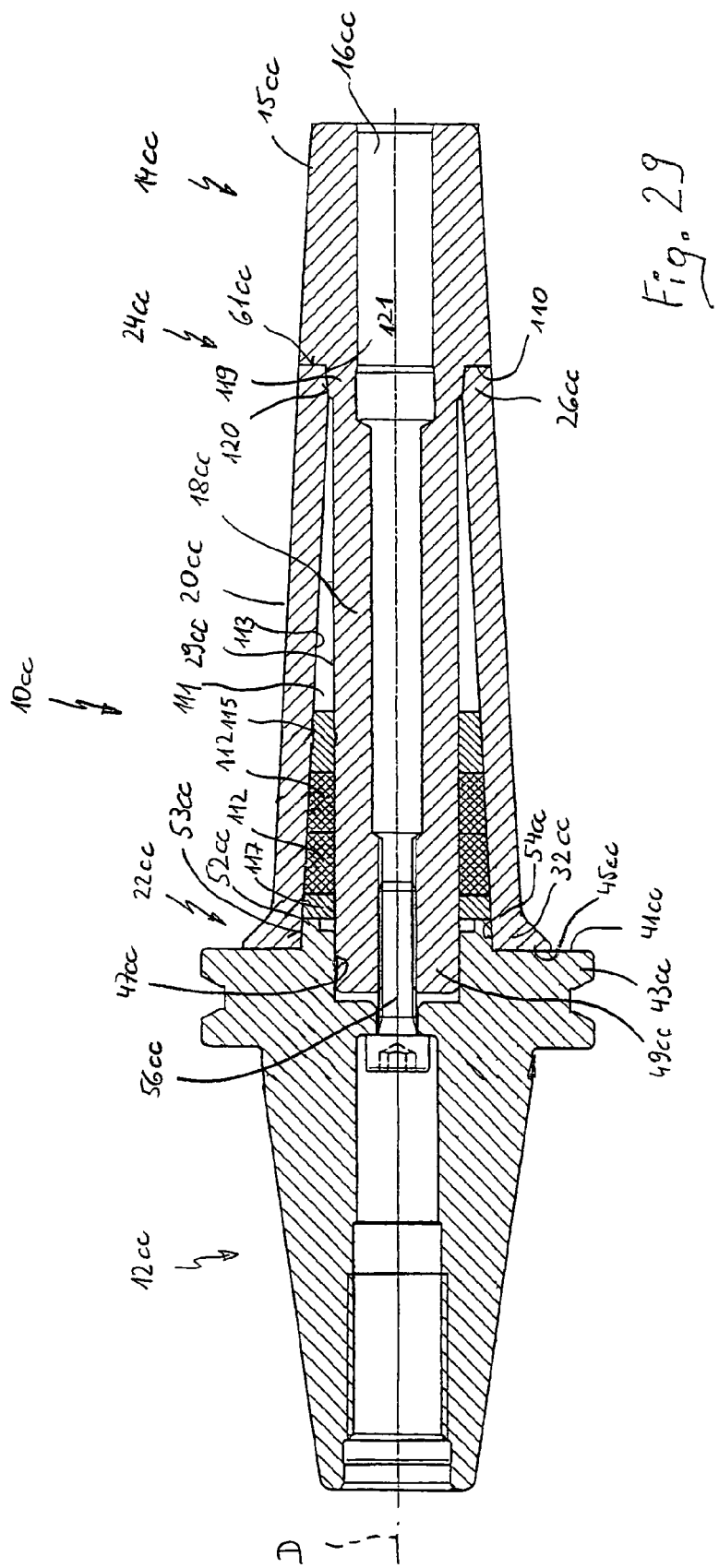
FIGS. 29 and 30 show axially directed longitudinal sections through tool holders with damping elements installed.

FIG. 29 shows a variant of a tool holder 10*cc* with a basic design similar to the tool holder 10*h* in FIG. 9. The tool holder 10*cc* has an essentially conical sleeve 20*cc* which is clamped in under compressive loading between the supporting locations 22*cc* and 24*cc* of the coupling formation 12*cc*, on the one hand, and the clamping formation 14*cc*, on the other hand, and has the end surface 45*cc* of its larger-diameter end 32*cc* supported in a joint-forming manner on the axis-normal end surface 41*cc* of the annular flange 43*cc* of the coupling formation 12*cc*. The smaller-diameter end 26*cc* of the sleeve 20*cc* has its end surface 61*cc* supported in a joint-forming manner on an annular shoulder 110 of the clamping formation 14*cc*. The joints which are formed at the supporting locations 22*cc* and 24*cc* have vibration-reducing properties.

In addition, the sleeve 20*cc* is centered radially with slight press-fit action in the region of its ends. Integrally formed on the coupling formation 12*cc* is an annular collar 52*cc*, of which the outer circumferential surface 53*cc*, which is adapted to the conicity of the sleeve 20*cc*, centers the sleeve 20*cc* on its inner circumferential surface 54*cc*. In the region of the supporting location 24*cc*, the clamping formation 14*cc* is provided with an annular extension 119, of which the outer circumferential surface 120 butts with slight radial press-fit action against the inner circumferential surface 121 of the clamping formation 14*cc* and centers the sleeve 20*cc* in the radial direction.

The sleeve 20*cc* consists of hard metal, for example, fine-grained hard metal, e.g. of the K20 type, or else coarse-grained hard metal, e.g. of the K50 type. However, the sleeve may also consist of a heavy metal or a metal matrix composite material (MMC), for example ferrotitanite. Ceramic or glass-fiber-reinforced or carbon-fiber-reinforced plastic are also suitable materials for the sleeve 20*cc*. It goes without saying, however, that the sleeve 20*cc* may also consist of tool steel, although the materials which have been explained above are preferred. It also goes without saying that the sleeves which have been explained above may likewise consist of the preferred materials.

The clamping formation 14*cc* is connected integrally to a cylindrical shank section 18*cc*, of which the free end is centered, but guided in a radially displaceable manner, in an annular cutout 47*cc* of the coupling formation 12*cc*. A clamping screw 56*cc* clamps the shank section 18*cc* against the coupling formation 12*cc* and thus ensures compressive prestressing of the sleeve 20*cc*. It goes without saying that, instead of the clamping screw 56*cc*, it is also possible to provide other force-transmitting fixing means as have been explained, for fixing the clamping shank in the coupling formation with reference to FIGS. 3, 4, 10, 14 and 19.

The conical sleeve 20*cc* is spaced apart radially from the shank section 18*cc*, between the supporting locations 22*cc* and 24*cc*, to form a conical annular chamber 111. The annular chamber 111 contains at least one annular damping element 112, in this case a plurality of annular damping elements 112, which butt in a frictionally fitting manner with radial prestressing, against the outer circumference 29*cc* of the shank section 18*cc*, on the one hand, and against the inner circumference 113 of the sleeve 20*cc*, on the other hand. The damping elements 112 consist of elastomeric or rigidly elastic material and are fixed axially between two stop rings 115, 117. In the case of the shank section 18*cc* being subjected to torsional vibration relative to the sleeve 20*cc*, and also in the case of bending vibration, the damping elements 112 damp the vibration.

The damping elements 112 may be oversized radially relative to the inner circumference 113 and/or outer circumference 29*cc*, so that they are seated with radial press-fit action in the annular chamber 111. In addition, or also as an alternative, however, the radial prestressing of the damping elements 112 may also be produced by axial bracing between the two stop rings 115, 117, in that the annular shoulder 52*cc*, which centers the end 32*cc* of the sleeve 20*cc* on the coupling formation 12*cc*, adjusts the adjacent stop ring 117*e* by a predetermined distance towards the other stop ring 115, which is supported in the annular chamber 111. The radial bracing here is achieved by reducing the axial spacing between the stop rings 115, 117. In addition, or as an alternative, for the purpose of increasing the radial prestressing, the damping elements 112 can be driven into the tapering gap of the annular chamber 111.

The sleeve 20*cc* may consist of tool steel as in the case of all the embodiments which have been described above, but, in order to improve the damping properties, it is preferably produced from hard metal, as may also be the case with the embodiments which have been explained above.

Figure 30:
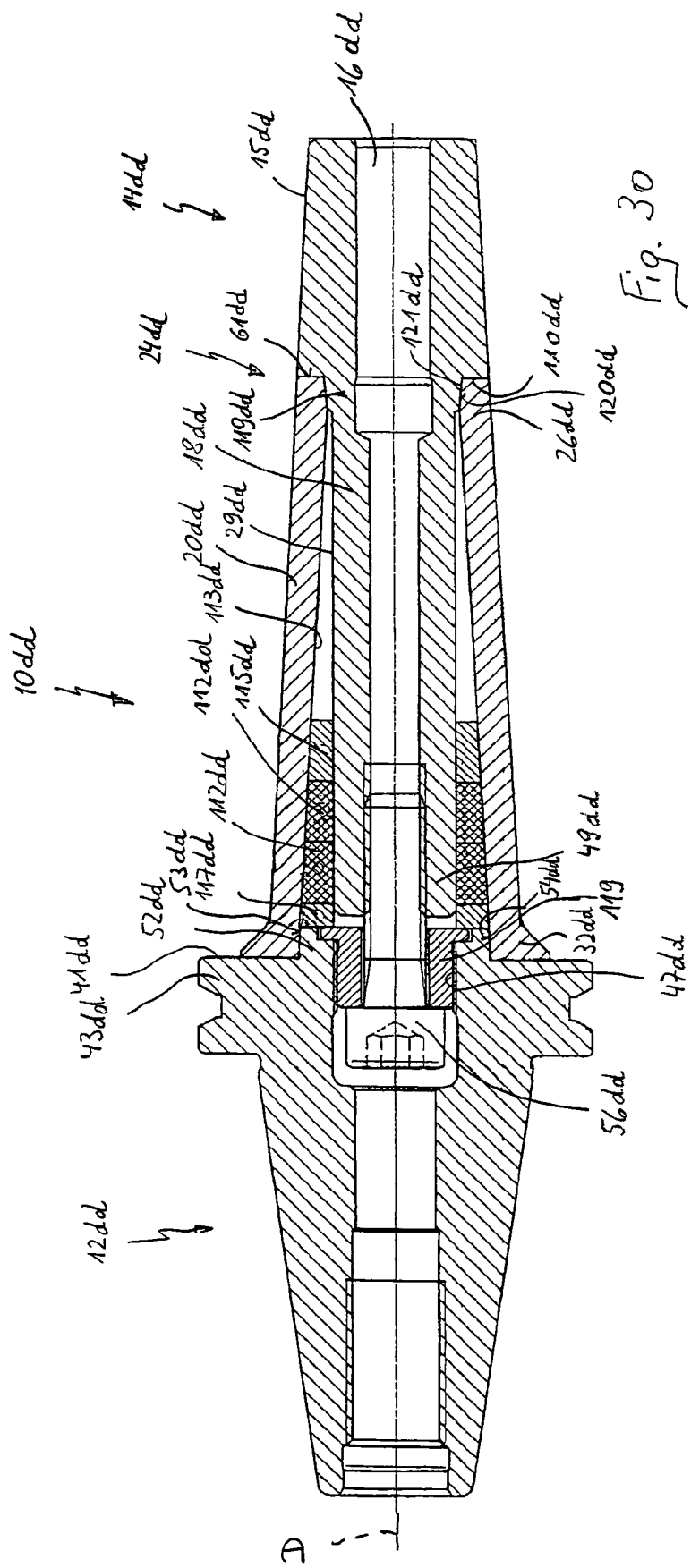

FIG. 30 shows a tool holder 10*dd*, which differs from the tool holder of FIG. 29 primarily in that the stop ring 117*dd*, rather than being supported on the annular shoulder 52*dd*, which centers the end 32*dd* of the sleeve 20*dd* is supported on a threaded sleeve 119, which is screwed into a central threaded opening 47dd of the coupling formation 12dd. The threaded sleeve 119 allows adjustment of the axial spacing between the stop rings 115dd and 117dd, and thus adjustment of the radial prestressing of the damping elements 112dd. The end region 49dd of the shank section 18dd is clamped against the coupling formation 12dd under tensile loading by means of a bolt 56dd, in order thus for the sleeve 20dd to be prestressed under compressive loading. It goes without saying that the end 49dd of the shank section 18dd, if appropriate, may also pass through the threaded sleeve 119 and be centered in the threaded sleeve 119, or else the coupling formation 12dd. If the end 49dd is centered in the coupling formation 12dd, it is also possible for the end 49dd to be connected to the coupling formation 12dd in some other way such that it can be subjected to tensile loading, as has been explained above for force-fitting or form-fitting connections.

Figure 31:
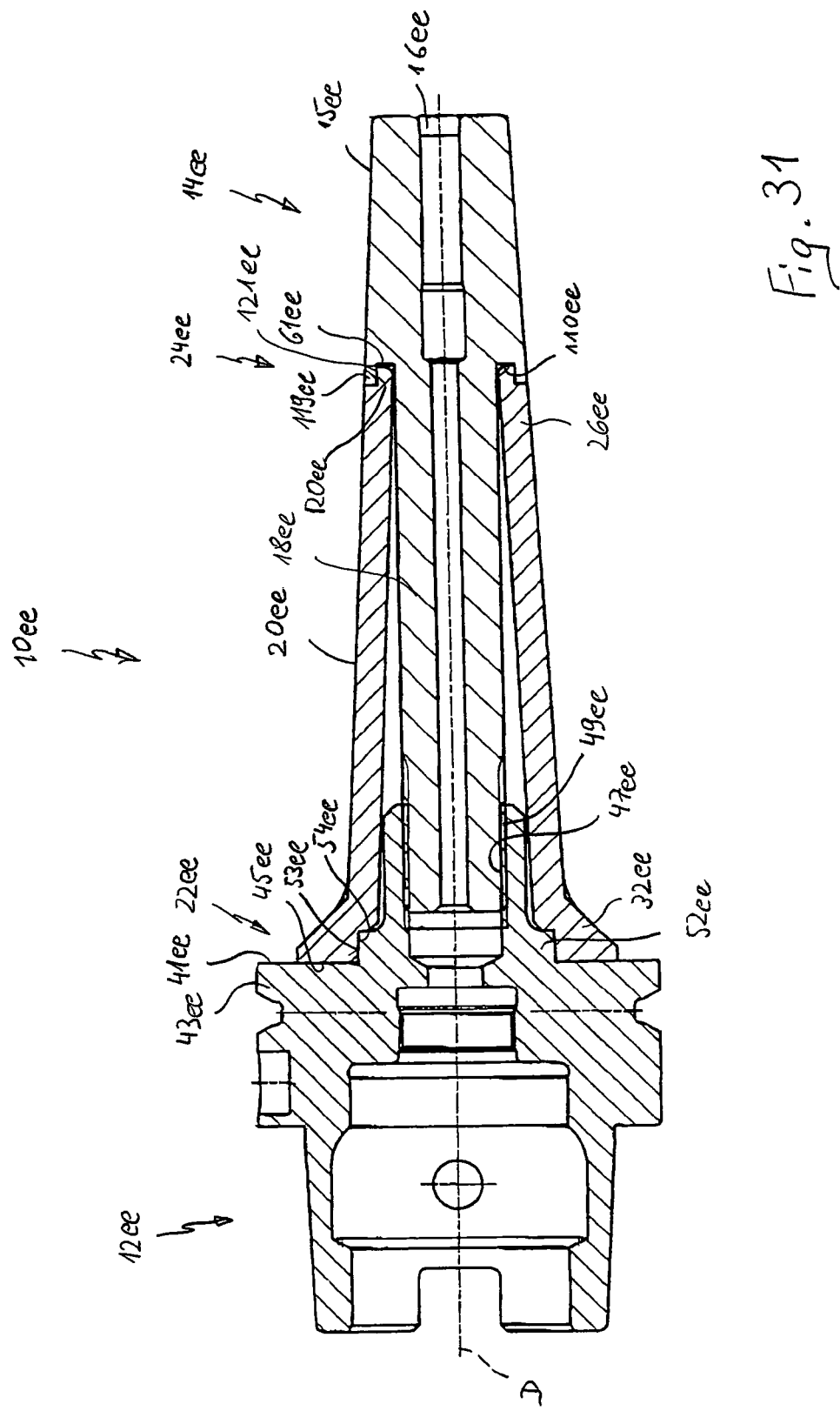
FIGS. 31 to 33 show axially directed longitudinal sections through tool holders with vibration-reducing properties.

FIG. 31 shows a variant of the tool holder from FIG. 29 although, in contrast to the latter tool holder, it does not contain any damping elements 112 between its shank section 18ee and its sleeve 20ee. Furthermore, the shank section 18ee in a manner similar to FIG. 10, has its free end 49ee screwed into a threaded opening 47ee of the coupling formation 12ee. While the clamping formation 12ee is centered radially to form a joint in the manner which has been explained with reference to FIG. 29, the annular extension 119ee encloses the axial end 26ee of the sleeve 20ee from the radially outward direction and has its inner circumferential surface 120ee butting in a joint-forming manner against the outer circumferential surface 121ee of the sleeve 20ee. This has the advantage that thermal expansions of the clamping formation 14ee which is designed as a shrink-fit chuck, do not affect the end 26ee of the sleeve 20ee and, accordingly, there is no possibility of the sleeve 20ee being damaged by thermal expansion. This is advantageous, in particular, if the sleeve 20ee, as has been explained above, consists of brittle material e.g. ceramic or the like.

Figure 32:
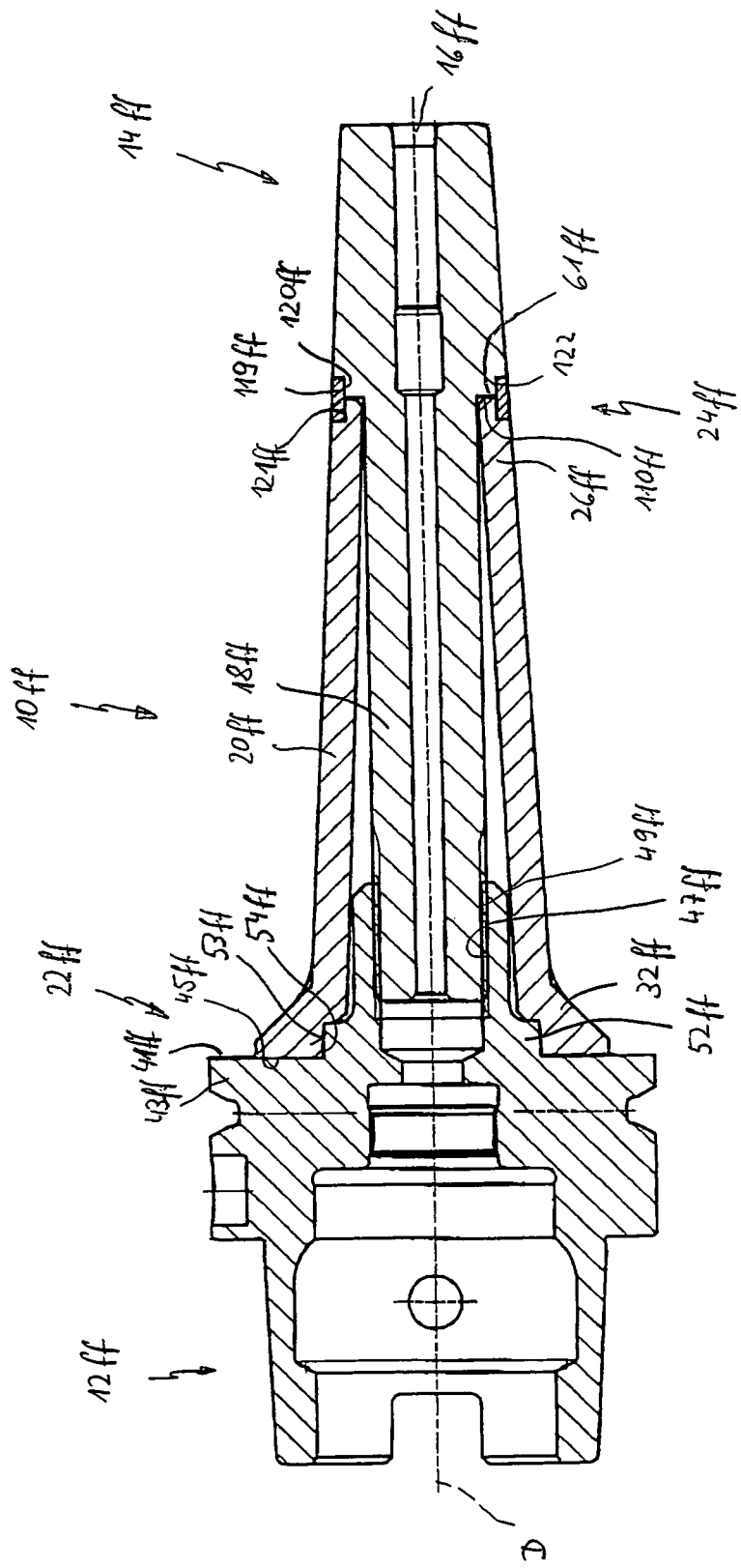

The tool holder 10ff, which is illustrated in FIG. 32 differs from the tool holder of FIG. 31 merely in that the extension which centers the end 26ff of the sleeve 20ff radially, this end being directed toward the clamping formation 14ff, is not connected integrally to the clamping formation 14ff; rather, it is formed by a separate supporting ring 119ff which consists, for example, of steel or the like and has its inner circumferential surface 120ff enclosing both the outer circumferential surface 121ff of the sleeve 20ff and an outer circumferential surface 122 of the clamping formation 14ff with slight radial press-fit action. The ring 119ff centers the end 26ff of the sleeve 20ff relative to the clamping formation 14ff. While the inner circumferential surface 120ee of the tool holder 10ee in FIG. 31 requires a comparatively high level of production outlay, the inner surface 120ff of the ring 119ff can be produced cost-effectively as a mating surface. The sleeve 20ff consists of the materials which have been explained above with reference to FIG. 29.

Figure 33:
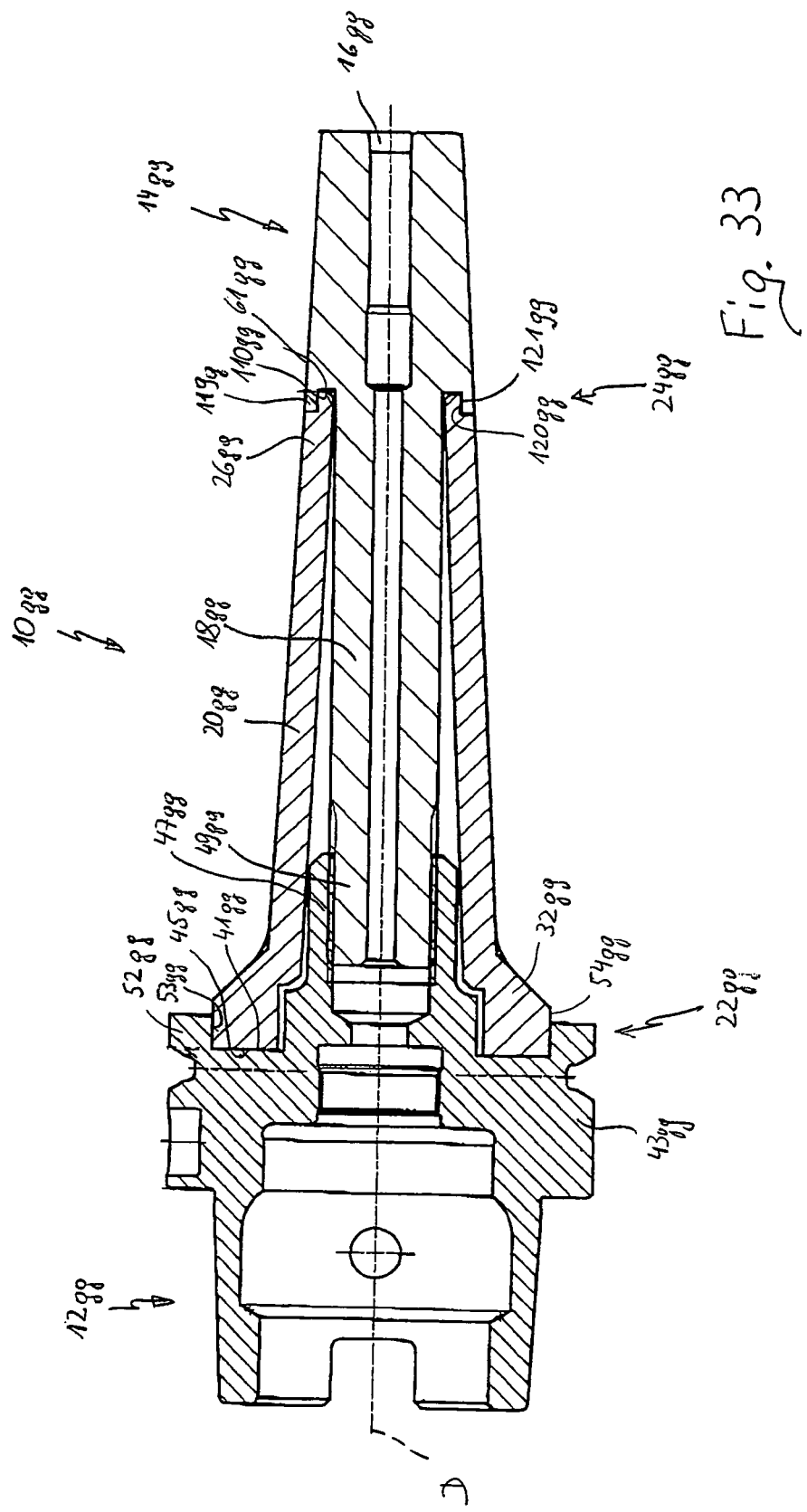

FIG. 33 shows a tool holder 10gg similar to the tool holder 10ee in FIG. 31. In contrast to the tool holder 1ee, however, the end 32gg of the sleeve 20gg, this end being adjacent to the coupling formation 12gg, is centered in the radially outward direction by an annular collar 52gg as has already been explained with reference to FIG. 8. However, in this case, the supporting location 22gg is in the form of a joint. The annular collar 52gg of the coupling formation 12gg, this collar centering the sleeve 20gg, in the radially outward direction with slight press-fit action, can absorb expanding forces of the conically flared sleeve 20gg, these forces being produced on account of the axial bracing force, without any centering errors occurring.

The features of the tool holders which have been illustrated in FIGS. 1 to 33 can be combined with one another in any desired manner.

The invention claimed is:

1. A tool holder for a tool to be rotated about an axis of rotation, the tool holder comprising;
   a clamping shank which, at one end region, has a clamping formation for securing the tool coaxially and, at its other end region has a coupling formation for coaxial coupling to a machine tool,
   a bracing arrangement connected to the clamping shank which, in an axial bracing section arranged in the axial direction between the clamping formation and the coupling formation, subjects the clamping shank to a bracing force with a bracing-force component acting in the axial direction,
   wherein, in the bracing section, at least one of the clamping shank and bracing arrangement is designed as a sleeve which encloses the other one of the clamping shank and bracing arrangement coaxially and has an external and/or internal diameter which increases in the direction of its end which is adjacent to the coupling formation, and
   wherein the clamping formation projects beyond the sleeve and is designed for securing the tool with a shrink fit.

2. The tool holder as claimed in claim 1, wherein the sleeve is supported on the tool holder such that its ends can be pushed away from one another under tensile loading, and the clamping shank comprises a shank section which connects the coupling formation to the clamping formation such that it can be subjected to compressive loading.

3. The tool holder as claimed in claim 2, wherein at its end, which is in the vicinity of the clamping formation, the sleeve engages behind an annular shoulder of the clamping shank, this annular shoulder being oriented away from the coupling formation, and at its other end, the sleeve is screwed to the tool holder or fixed to the tool holder in particular by a non-releasable joining method, in particular welding.

4. The tool holder as claimed in claim 3, wherein, at the other end, the sleeve has a radially outwardly projecting annular collar which is screwed against a radially outwardly extending annular shoulder of the coupling formation.

5. The tool holder as claimed in claim 3, wherein, at the other end, the sleeve has an internal thread which is screwed on to an external thread of the clamping shank.

6. The tool holder as claimed in claim 2, wherein, at its end, which is in the vicinity of the clamping formation, the sleeve engages behind an annular shoulder of the tool holder in the region of the clamping formation, this annular shoulder being oriented away from the coupling formation, or is connected integrally to the tool holder and, at its other end, the sleeve is connected integrally to the tool holder, in particular to a radially outwardly projecting annular collar of the coupling formation, and wherein, in the bracing region, the clamping shank is supported in a force-fitting and form-fitting manner on a tool holder surface which is fixed to the coupling formation.

7. The tool holder as claimed in claim 2, wherein the sleeve is fixed, in particular connected integrally, both to the clamping formation and to the coupling formation, and the region of the clamping formation is supported on the region of the coupling formation via the shank section.

8. The tool holder as claimed in claim 7, wherein the shank section is designed as a component which is separate from the clamping formation and the coupling formation.

9. The tool holder as claimed in claim 1, wherein the sleeve is supported on the tool holder at its ends such that the latter can be pushed toward one another under compressive loading, and the clamping shank comprises a shank section which connects the coupling formation to the clamping formation such that it can be subjected to tensile loading.

10. The tool holder as claimed in claim 9, wherein the sleeve has one of its axial ends supported on the coupling formation, and has its other end supported on an annular shoulder of a component which can be screw-connected or press-fit connected axially relative to the coupling formation.

11. The tool holder as claimed in claim 10, wherein the component is designed as a screw-connection ring which is screwed on to the clamping shank.

12. The tool holder as claimed in claim 10, wherein a radially projecting annular collar of the coupling formation supports one of the axial ends of the sleeve.

13. The tool holder as claimed in claim 12, wherein the annular shoulder is integrally formed on the component and the component is screw-connected to the region of the coupling formation.

14. The tool holder as claimed in claim 10, wherein the other end of the sleeve is supported on an annular shoulder of the tool which is retained in the clamping formation.

15. The tool holder as claimed in claim 10, wherein the annular shoulder is integrally formed on the clamping formation, and the latter is fastened in an axially displaceable manner on the clamping shank.

16. The tool holder as claimed in claim 9, wherein the sleeve has one of its axial ends supported on the coupling formation, in particular on a radially projecting annular collar of the coupling formation, and has its other end supported in a frictionally fitting manner on the clamping shank.

17. The tool holder as claimed in claim 1, wherein the sleeve comprises a plurality of sleeve shells which are arranged coaxially in relation to one another.

18. The tool holder as claimed in claim 17, wherein the sleeve shells butt against one another at least over a part of their axial length.

19. The tool holder as claimed in claim 17, wherein one of the sleeve shells is subjected to compressive loading and another of the sleeve shells is subjected to tensile loading.

20. The tool holder as claimed in claim 1, wherein formed radially between the sleeve and the shank section is an annular space which is filled with a material which is subjected to pressure, in particular with a free-flowing material or a plastically deformable or elastic material.

21. The tool holder as claimed in claim 20, wherein the axial ends of the sleeve are connected in a tension-resistant and sealed manner to the tool holder, in particular are friction-welded thereto, and wherein the sleeve encloses the clamping shank with radial spacing and, in order to produce axial tensile bracing of the sleeve, material which is subjected to pressure, in particular elastic material is introduced between the clamping shank and the sleeve.

22. The tool holder as claimed in claim 20, wherein pressure-changing means are provided for changing the pressure of the material in the annular space.

23. The tool holder as claimed in claim 1, wherein the clamping shank or the sleeve insofar as it is subjected to compressive loading, is supported axially via a damping element relative to the other of the clamping shank and bracing arrangement, which is subjected to tensile loading.

24. The tool holder as claimed in claim 1, wherein at least over part of its axial length, the sleeve butts in a frictionally fitting manner against the circumference of the clamping shank.

25. The tool holder as claimed in claim 24, wherein the sleeve has its two ends supported in an axially prestressed manner on the tool holder, that end of the sleeve which is axially in the vicinity of the clamping formation being retained on the clamping shank such that it is fixed axially in a frictionally fitting manner, with press-fit action, in a friction-fit section.

26. The tool holder as claimed in claim 24, wherein the sleeve and the clamping shank, adapted to one another at least over part of the friction-fit section, are of slightly conical form.

27. The tool holder as claimed in claim 24, wherein the sleeve is supported on the tool holder such that it is prestressed axially under compressive loading, and it encloses the clamping shank with radial spacing in the axial direction between the friction-fit section and the end which is directed axially toward the coupling formation and is supported on the tool holder.

28. The tool holder as claimed in claim 27, wherein in the axial direction between the friction-fit section and the other end, which is supported on the tool holder, at least one damping ring made of an elastically compressible material is arranged between the circumference of the clamping shank and the inner lateral surface of the sleeve.

29. The tool holder as claimed in claim 1, wherein the clamping shank merges into an annular shoulder of the coupling formation and the sleeve is supported axially on the annular shoulder, and wherein at least the end of the sleeve, such end being supported on the annular shoulder, is designed as a conical section which tapers axially away from the annular shoulder.

30. The tool holder as claimed in claim 29, wherein the conical section covers over at least one damping ring.

31. The tool holder as claimed in claim 29, wherein the sleeve is prestressed axially under compressive loading.

32. The tool holder as claimed in claim 1, wherein the sleeve comprises an axially resilient zigzag-spring section.

33. The tool holder as claimed in claim 1, wherein the sleeve has its two ends supported axially on the tool holder, there being arranged in the supporting path of one of the two ends of the sleeve a supporting device which can be moved axially relative to the tool holder and has at least one supporting piston, which is guided in an axially displaceable manner in an associated pressure chamber which contains a free-flowing or plastically deformable pressure medium, the pressure chamber being assigned an adjusting element for changing the pressure in the pressure medium.

34. The tool holder as claimed in claim 33, wherein the supporting piston is designed as an annular piston which can be displaced axially in an annular space forming a pressure chamber and on which one of the two ends of the sleeve is supported or to which this end is connected.

35. The tool holder as claimed in claim 33, wherein the adjusting element is a piston screw which acts on the pressure medium.

36. The tool holder as claimed in claim 33, wherein the other of the two ends of the sleeve is fixed to the clamping shank, or is supported axially on an annular collar of the clamping shank, in particular on a securing ring which is retained in a releasable manner on the clamping shank.

37. The tool holder as claimed in claim 1, wherein at least over part of its axial length, the sleeve encloses the shank section with radial spacing to form an annular space, and arranged in a radially prestressed manner in the annular space is an annular damping element which is in surface abutment against the inner circumferential surface of the sleeve and the outer circumferential surface of the shank section.

38. The tool holder as claimed in claim 37, wherein the damping element consists of elastically compressible material, and wherein the annular space is bounded axially by annular shoulders, between which the damping element is braced axially in order to produce radial prestressing.

39. The tool holder as claimed in claim 38, wherein one of the annular shoulders can be displaced axially in order to change the prestressing of the damping element.

40. The tool holder as claimed in claim 39, wherein the axially displaceable annular shoulder is formed by an axially displaceable screw-connection arrangement which is retained on the coupling formation.

41. The tool holder as claimed in claim 37, wherein the annular space is conical.

42. The tool holder as claimed in claim 41, wherein the damping element is prestressed in the direction of the tapering of the conical annular space.

43. The tool holder as claimed in claim 1, wherein at least over part of its axial length, the sleeve encloses the shank section with radial spacing to form an annular space, and wherein an absorption-mass body is arranged on the shank section in the annular space.

44. The tool holder as claimed in claim 43, wherein the absorption-mass body can be displaced along the shank section.

45. The tool holder as claimed in claim 1, wherein the clamping shank and bracing arrangement consist of different materials.

46. The tool holder as claimed in claim 45, wherein said hard metal or heavy metal or a metal matrix composite material or ceramic or plastic comprise glass-fiber-reinforced or carbon-fiber-reinforced plastic.

47. The tool holder as claimed in claim 45, wherein the one of the clamping shank and bracing arrangement designed as the sleeve, at least in its region which transmits the axial bracing force, consists of hard metal or heavy metal or a metal matrix composite material or ceramic or plastic.

48. The tool holder as claimed in claim 1, wherein one of the clamping shank and bracing arrangement is supported on the other of the clamping shank and bracing arrangement via at least one joint which transmits the axial bracing force.

49. The tool holder as claimed in claim 48, wherein the joint is provided between two circumferential surfaces of the two components which butt against one another with radial press-fit action.

50. The tool holder as claimed in claim 48, wherein the joint is provided between two axially abutting surfaces of the clamping shank and bracing arrangement.

51. The tool holder as claimed in claim 48, wherein a damping-material layer is arranged between the two joint-forming surfaces.

52. The tool holder as claimed in claim 48, wherein at least one of the two axial ends of the sleeve-forming one of the clamping shank and bracing arrangement forms one of the abutting surfaces of the joint, and a circumferential surface is integrally formed, or fitted, on the other of the clamping shank and bracing arrangement and centers the sleeve radially in the region of this end.

53. The tool holder as claimed in claim 52, wherein the joint-forming surfaces are provided in each case at the two ends of the sleeve, and the sleeve is centered radially in the region of the two ends by circumferential surfaces of the other of the clamping shank and bracing arrangement.

54. The tool holder as claimed in claim 52, wherein the circumferential surface of the other of the clamping shank and bracing arrangement butts with radial press-fit action against a circumferential surface of the sleeve.

55. The tool holder as claimed in claim 52, wherein the circumferential surface of the other of the clamping shank and bracing arrangement encloses the sleeve in a radially outward direction in the region of at least one of its axial ends.

56. The tool holder as claimed in claim 55, wherein at least that end of the sleeve which is adjacent to the clamping formation is enclosed in the radially outward direction by the circumferential surface of the other of the clamping shank and bracing arrangement.

57. The tool holder as claimed in claim 55, wherein that circumferential surface of the other of the clamping shank and bracing arrangement which encloses the sleeve in the radially outward direction in the region of at least one of its ends, in particular in the region of its end, which is adjacent to the clamping formation, is formed by a ring which covers over the joint axially and also encloses the other of the clamping shank and bracing arrangement in the radially outward direction.

58. The tool holder as claimed in claim 1, wherein said tool to be rotated is a drilling tool.

59. The tool holder as claimed in claim 1, wherein said tool to be rotated is a milling tool.

60. The tool holder as claimed in claim 1, wherein said tool to be rotated is a reaming tool.

61. The tool holder as claimed in claim 1, wherein said tool to be rotated is a grinding tool.

* * * * *